United States Patent
Karras

(10) Patent No.: US 6,873,617 B1
(45) Date of Patent: Mar. 29, 2005

(54) MEANS FOR AND METHODS OF "IN-PROGRESS" FRAUD, BILLING AND MAINTENANCE IN A SS#7 NETWORK OF HIGH SPEED DATA LINKS

(75) Inventor: Ernest Karras, Oak Brook, IL (US)

(73) Assignee: Tekno Industries, Inc., Bensenville, IL (US)

( * ) Notice: Subject to any disclaimer, the term of this patent is extended or adjusted under 35 U.S.C. 154(b) by 0 days.

(21) Appl. No.: 09/491,414

(22) Filed: Jan. 26, 2000

Related U.S. Application Data

(60) Provisional application No. 60/118,449, filed on Feb. 3, 1999.

(51) Int. Cl.[7] ............................................. H04M 3/22
(52) U.S. Cl. ............................ 370/389; 379/114.14
(58) Field of Search ............................ 370/389, 392, 370/393, 395.62, 395.7, 395.71, 395.72; 379/70, 79, 85, 88.08, 88.09, 112.01, 112.06, 114.14, 133, 142.07, 189, 196, 199, 207.02

(56) References Cited

U.S. PATENT DOCUMENTS 5,438,570 A  *  8/1995  Karras et al. ............... 379/133
5,706,338 A  *  1/1998  Relyea et al. ........... 379/114.14
5,802,145 A  *  9/1998  Farris et al. ................. 370/522
6,028,914 A  *  2/2000  Lin et al. ..................... 379/133
6,381,306 B1 *  4/2002  Lawson et al. ........ 379/112.06
6,393,113 B1    5/2002  Karras

* cited by examiner

Primary Examiner—Steven Nguyen
Assistant Examiner—Justin Philpott
(74) Attorney, Agent, or Firm—Michael Best & Friedrich LLP

(57) ABSTRACT

The invention relates to equipment for call-completion analysis on high speed data links in an SS#7 network. A pyramidal structure service observing system processes data packets from all high speed SS#7 data links communicates directly with other service observing systems in order to create real-time call detail records and statistical reports. The first system which receives an initial address message signal has jurisdiction over a call. If a second service observing system receives data on the same call, that data is forwarded to the first service observing system in real-time so that interim call detail records may be generated while calls are still in-progress. While any suitable and available path may be used to forward the data, a wide area network or a local area network provides the preferred path.

20 Claims, 10 Drawing Sheets

IDENTICAL TO FIG #6
OF
U.S. PATENT 5,438,570

MEANS FOR AND METHODS OF "IN-PROGRESS" FRAUD, BILLING AND MAINTENANCE IN A SS#7 NETWORK OF HIGH SPEED DATA LINKS

This is a formal application replacing provision application S. No. 60/118,449, filed Feb. 3, 1999.

This invention relates to means for and methods of detecting "in progress" fraud, lack of credit, maintenance problems and the like which occur during the progress of calls on high speed SS#7 data links configured in the form of an SS#7 system network and more particularly, to monitor many switching transfer points in real time in order to collect all data related to a call at one place where the call may be supervised while it is in progress.

BACKGROUND

U.S. Pat. No. 5,438,570 describes service observing equipment for use with the Signaling System Seven ("SS#7") Telephone Networks. Service observing equipment provides means for monitoring a switching network in order to determine the quality of service, billing verification and validation that is being given to the subscribers served by that network. The end product of the service observation equipment is "Call Records", "Report Summaries" and "Graphic Displays" relating to things about the network such as: how many calls went through which equipment, the called, calling and charge numbers, the length of time required to perform the various call functions, the billing duration, the number and type of call failures, the location of congestion, flagrant dispositions, missing messages, calls of an excessive duration, premature cut offs, peak and overall link loading, and the like. From this information, the telephone operating company may acquire many advantages ranging from reports on routine maintenance, instant maintenance, planning future expansion, justifying billings and rate hikes, selling additional services, detection and prevention of fraud and the like.

Patent application Ser. No. 09/098,045 filed Jun. 16, 1998 further advances the technology of U.S. Pat. No. 5,438,570 by generating interim call detail records from the SS#7 data stream while the call is "in-progress". Instead of waiting until the call is terminated, the advance is responsive to various triggers occurring during a call, thereby enabling the user to perform "in-progress" fraud detection and prevention, "real-time" pre-paid billable audits, plus "instantaneous" Investigation of maintenance problems.

This invention applies a similar technology to corresponding networks of high speed data links. More particularly, the network being monitored has a number of high speed, synchronous data links extending between switching transfer points ("STP") which enable switching points or end offices ("SP") to communicate directly with each other, via special protocols. The data link network is independent of voice or other communication paths normally used by the telephone type of network.

Historically, the surveillance and maintenance of an STP's or SP's have been performed with protocol analyzers. These devices monitor multiple links in order to individually decode and store all encountered message signal units (MSU) for selectively displaying their contents. Traps may be pre-configured to capture MSU's either in real-time or from storage, but they are un-correlated.

A "transaction" is an enquiry addressed to a data base related to a call which is being set up by the SS#7 system. For example, the "transaction" might be caused by receipt of an "800" number. The SS#7 system asks the data base for routing information (the number of the line paying for the "800" call) and then forwards the call according to the routing information that it receives. There are many other transactions.

If the user already knows what he is looking for and he must laboriously and manually search through millions of stored MSU's in order to find those MSU's associated with a specific call set up or the system must make a query transaction before an analysis of an "entire" call can be performed. In many instances where there is limited storage capacity, the MSU's at the end or beginning of long-duration calls will be "lost" thus making a thorough analysis of completed call set ups impossible.

The embodied invention automatically correlates all MSU's monitored at Switching Transfer Points in real-time into a "memory data block"representing an entire call set up or query transaction before displaying or storing for processing it thereby eliminating the need for labor intensive manual correlation. Each block is assigned a final disposition category so its retention can be pre-filtered to retain only desired data. In this manner, one need not know what he is looking for ahead of time and many more "relevant" MSU's may be stored, pre-correlated for instant analysis in the same storage capacity. This procedure also eliminates the loss of both the beginning and the end MSU data because of limited storage.

The inventive concept provides more efficient operations, but is not limited to the operations described in U.S. Pat. No. 5,438,570 and patent application Ser. No. 09/098,045. It is related to the Signaling System #7 protocol (without voice) and works at the signal transfer points (STP) as well as signaling points (SP). The term "Dump 7" is a trademark for an output format of an entire data block for performing a more comprehensive and faster protocol analysis of calls or queries.

The calling office assembles certain required control, monitoring, and supervision information into data packets, each of which is identified by its own address assigned on a per call basis. The data packet also contains identifications of calling and called subscribers, types of calls, equipment, and other pertinent information relating to the call routing identified by the packet address or "routing label".

The observation equipment has a plurality of memory locations (data blocks) each being capable of storing data relative to a given data packet. For the duration of a call, these locations are assigned individual addresses corresponding to the pertinent data packet address. As the data packets are transmitted along the high speed data links, the service observation equipment decodes those packets having an address of interest and stores the decoded information in a pertinent one of the memory locations identified by the call's address which might consist of a link out, point code and circuit identification code.

After the receipt of the data packet indicating that a call has terminated, the data stored in the pertinent memory location are read out to make appropriate "Service Observation Reports" and/or "Call Records", for that call. The data may also be stored in a secondary memory for further or future report processing. Then, the memory location is emptied and reassigned to accumulate data relative to a new packet address.

After the call is terminated, the "Call Records" and "Summary Reports" are invaluable tools for giving a better grade of network service for performing fraud detection, billing, or the like. However, they are after-the-fact tools and do little or nothing to correct problems, especially of preventing crimes, while they are occurring. For example, if a person has a poor credit rating, heretofore, the only options have been either to suspend his network service or to allow his calls to go through.

A moment's thought will bring to mind many situations where it would be desirable for the operating company to take suitable action while the call is in progress. For example, calls from an area frequented by drug dealers, criminals, and the like, may require different forms of action depending upon a profile of calls which are made by such people. Other services which may be provided by the inventive system are:

Process SS#7 data from mated STP's links to trap and report on "Hot" calling or called numbers in real-time so independent audio surveillance may be performed while the call is in-progress.

Process SS#7 data from mated STP's links to threshold long duration calls while in-progress for analysis and premature cutoff due to lack of credit scenarios.

Process SS#7 data from mated STP's links to threshold multiple calls in-progress from the same credit card for analysis and premature cutoff due to circumstances of stolen credit cards.

Process SS#7 data from mated STP's links and trap on called numbers in real-time, specifically while the call is set up, to trace the various routes the switching network assigns as a possible source of error.

Process SS#7 data from mated STP's link's to classify calls into disposition categories such as busy, don't answer, no answer messages, switch blockage etc. to zero in on Equipment Blockages and Failures in real-time and generate quality assurance statistical reports.

Process SS#7 data from mated STP's links in real-time to produce data blocks of correlated call messages in a decoded Dump 7 format for instant protocol analysis of network failures.

Process SS#7 data from mated STP's links to produce more comprehensive custom call detail records for billing subscribers for new advanced intelligent network features and validating other billing sources.

Processing SS#7 data from mated STP's links to more accurately calculate minutes of usage between switching network's and including "incompleted" call minutes to more favorably negotiate reciprocal billing arrrangements.

Process SS#7 data from mated STP's links to correlate messages into data blocks with a GPS time stamp to more accurately calculate holding times on various routes for better traffic engineering and eliminating network congestion.

Process SS#7 data from mated STP's links to generate real-time link syncronization, occupancy and error graphics analysis and for centralized real-time alarming of exceeded thresholds.

Processing SS#7 data from mated STP's links to count message traffic in real-time and alarm mass call set ups which create looping congestion plus investigate network message distribution.

Processing SS#7 data from mated STP's links to provide a message count by protocol between originating pointcode and destination pointcode for performing usage measurement billing, verification and validation.

Process SS#7 data from mated STP's links to correlate into CDR's for custom filtration, formatting and transmission to a variety of host RDBMS computer applications over a WAN.

Process SS#7 data from mated STP's links into custom statistical reports for scheduled transmission to variety of host computer applications over a WAN.

Processing SS#7 data from mated STP's links in real-time into interim, thresholded, custom filtered and formatted ZIP records for transmission over a WAN to a variety of in-progress computer applications.

Processing SS#7 data from mated STP's links in order to to function over a Wide Area Network as centralized source of user customized SS#7 data.

Processing SS#7 data from mated STP's links in order to function over a Wide Area Network as a centralized source of real-time graphics for visually analyzing the performance of the SS#7 Network.

BRIEF DESCRIPTION OF THE INVENTION

Accordingly, an object of the invention is to provide new and novel means for and methods of monitoring a high speed data link network switching system for giving the flexibility of taking different types of action while a call is in progress depending upon an observation of conditions during the call.

In keeping with an aspect of the invention, this and other objects are accomplished by using the same type of SS#7 Network link connections and hardware that are described in U.S. Pat. No. 5,438,570. An additional feature (called "ZIP Record") is generated from the SS#7 information packets. The term "ZIP" is an acronym for "ZIP Information Packet". As shown in U.S. Pat. No. 5,438,570, FIGS. 9A and 9B, it is consistent with the SS#7 symbology for each type of disposition to be identified by three letters or a combination of letters and numbers.

The "Call Records" are typically made after the termination of calls. The ZIP Record is somewhat like a stop motion, snap shot of the "Call Record" which is made in real time before a termination, a release, or a release complete message is detected. The taking of the "Snap Shot" or ZIP Record may be triggered by any of the SS#7 message signal units ("MSU"), the most interesting being IAM, ACM and ANM, or matching a called, calling or charge number or exceeding a time duration. Hence, the ZIP Record is available while the pertinent call is still in progress.

The foregoing description relates to my 1995 U.S. Pat. No. 5,438,570 which, in turn, relates to conventional telephone calls with or without associated voice paths at a switching point SP. The switching art has progressed to a point where similar call set up switching is done, by switching transfer points (STP) interconnected by wide area networks (WAN) without voice paths. The reason for switching without voice paths is for efficiency. However, to give greating meaning to the term "wide area high speed network", assume that the telephone companies also have their own private needs, for any of many purposes, such as: performing data base queries, billing collection, accounting, maintenance, or the like. These needs lead to one or more interconnected high speed data switching networks which include dedicated t-span or generically called "fiber optic networks". There may be any suitable number of such networks which may have to communicate with and through each other.

A moments' thought should make it clear that the STP's within these networks may be at widely scattered geographic locations. Thus, for example, a communication may be set up from New York to Los Angeles via, say, one or more STP's located in Cleveland, Chicago, St. Louis, Milwaukee, or Denver. The high speed data packets may be transmitted over one or more wide area networks and through any of these and, perhaps, many other STP locations.

The problem is to collect all data related to a call or transaction at one location regardless of where the data originates or which STP's are included in the connection. In order to centrally collect data, it is necessary to collect and store the data in substantially real time, which is extremely fast as compared to the speed of prior data transmissions. Thus, for example, if packet "A" occurs before packet "B", it is necessary to store packet "A" before storing packet "B". To accomplish this end, all packets are date and time stamped at the point of initial collection, responsive to time signals received from satellites of the global positioning system ("GPS").

The inventive system monitors all packets as they are being transmitted over the highspeed SS#7 links. The first SS#7 packet for any call set up carries an initial address message ("IAM") which determines the location where "all" the call data is stored for any particular call. Thereafter, when the monitoring equipment finds a packet with the same address, "it immediately" transmits it over the wide area network to the same location where the IAM is stored. At that location it takes in the pertinent packet, reads the date and time stamp, and stores the packets in a "Data Block" in the order in which they were received. This correlation process is performed in "real time" and while the call is in progress.

With this arrangement, it really does not make any real difference where the data is collected. In the foregoing example, the data might be collected at an appropriate location in any of the STP's: Cleveland, Chicago, St. Louis, Milwaukee, or Denver depending upon which STP is used. The correlated stored "Data Block" may be processed and/or forwarded to an appropriate location, "at any time" during the data collection process.

BRIEF DESCRIPTION OF THE DRAWING

A preferred embodiment of the invention is used in connection with the system shown in the attached drawings, in which.

Figure 1:
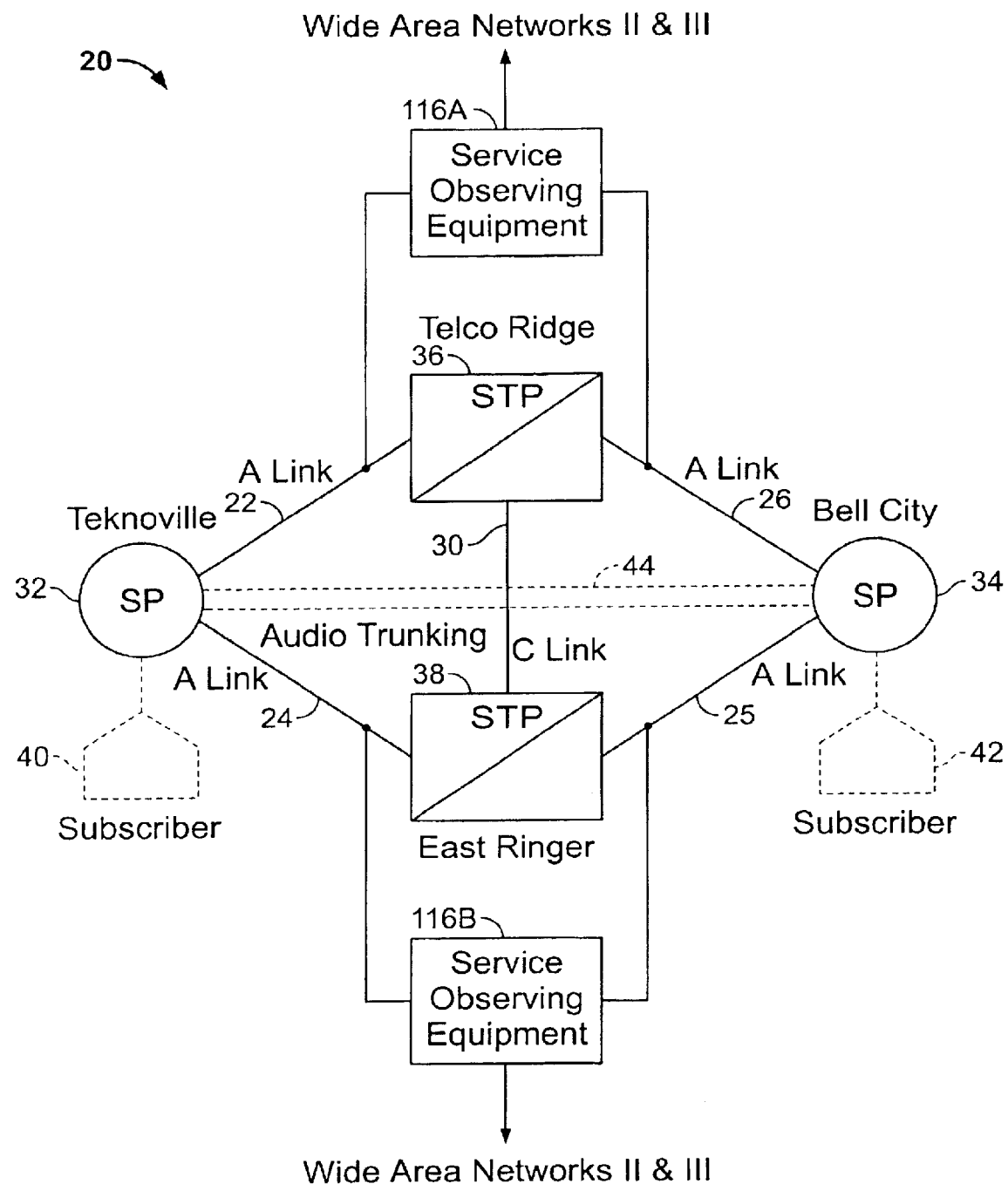
FIG. 1 is a simplified block diagram showing the principles of a Signaling System Seven telephone switching network.

Most of these figures are modifications of figures taken from U.S. Pat. No. 5,438,570 which may be consulted for more information. To make such a consultation easier, the reference numerals of the patent are retained herein where appropriate.

BRIEF DESCRIPTION OF SS#7 TELEPHONE SYSTEM

FIG. 1 shows a simplified SS#7 network 20 having four high speed SS#7 data signaling links 22, 24, 26, 28, coupled in two mated pairs (i.e., 22/24 a link set and 26/28 a link set). A C-Link 30 joins the center of the mated STP pairs. These five links are here shown as being associated with two cities "Teknoville" and "Bell City" at the calling and called ends, respectively, of a telephone call connection. The notation "SP" means end office switching points. These signaling offices are interconnected by high speed SS#7 data links which, as here shown, extend between the two cities via two "STP's" (Signaling Transfer Points) 36, 38. All data required to operate this system is segregated on a per call or transaction (query) basis as identified by pertinent packet addresses or as identified by the pertinent audio carrier channel or trunk for the older equipment with in-band signaling.

Once the signaling offices 32, 34 have conveyed enough information back and forth, a calling subscriber 40 is connected to a called subscriber 42 via an audio or communication trunk 44. During the setup and the entire duration of the call, telephone equipment in the two cities 34, 34 keep each other informed as to the status of the call by passing data packets back and forth over the signal links 22–28 through signaling transfer points 38 and 36.

In all, the data packets may have many different kinds of Message Signal Units ("MSU") which may be exchanged over the signal links 22–30 during any call. Fortunately, only a few of these messages are used with great regularity, the most being:

| COMMONLY USED CALL SETUP MSU'S | |
| --- | --- |
| Designator | Messages |
| IAM | Initial address message |
| ACM | Address complete message |
| ANM | Answer message |
| REL | Release message |
| RLC | Release complete message |
| COT | Continuity message |
| RSC | Reset circuit |
| SUS | Suspend |

In operation, a conventional call begins in Teknoville 32 with a calling subscriber station 40 going off hook, receiving conventional local dial tone, and dialing the telephone number of a called subscriber 42 in a distant Bell City 34. Responsive to the dialed telephone number, the local exchange equipment in Teknoville 32 formulates a data packet containing an initial address message ("IAM") including all information required to initiate a call, such as: calling number, called number, and any other pertinent information including a collect call, a call back with time and charges, etc. Then a "Routing Label" is added to the data packet, such as point codes and circuit identification codes identifying the office "Teknoville" 36 as the originating office and "Bell City" 34 as the destination office and the "Audio Trunk" which is to be used 44.

The local call originating equipment SP 32 in Teknoville sends the data packet over an available link, such as link 22. A "Switching Transfer Point" STP 36 at an intermediate city "Telco Ridge" forwards the data packet over link 26 to call destination equipment SP 34 in the called end office in Bell City. If for any reason, link 26 cannot be used at this time, or to even out traffic the data packet may be sent by STP 32 via C-Llink 30 to STP 38 at yet another intermediate city, "East Ringer." The data packet is then sent via the mated A-link 28 to SP 34.

Regardless of the path followed, the local office at Bell City 34 takes the appropriate action required by the message which it receives in the data packet.

In this set up situation, the Bell City equipment prepares a data packet with the originating data packet addresses. The information in this data packet is an Address Complete Message, ACM. The Bell City point code is now the originating point code (OPC) for this newly formulated data packet.

Figure 3:
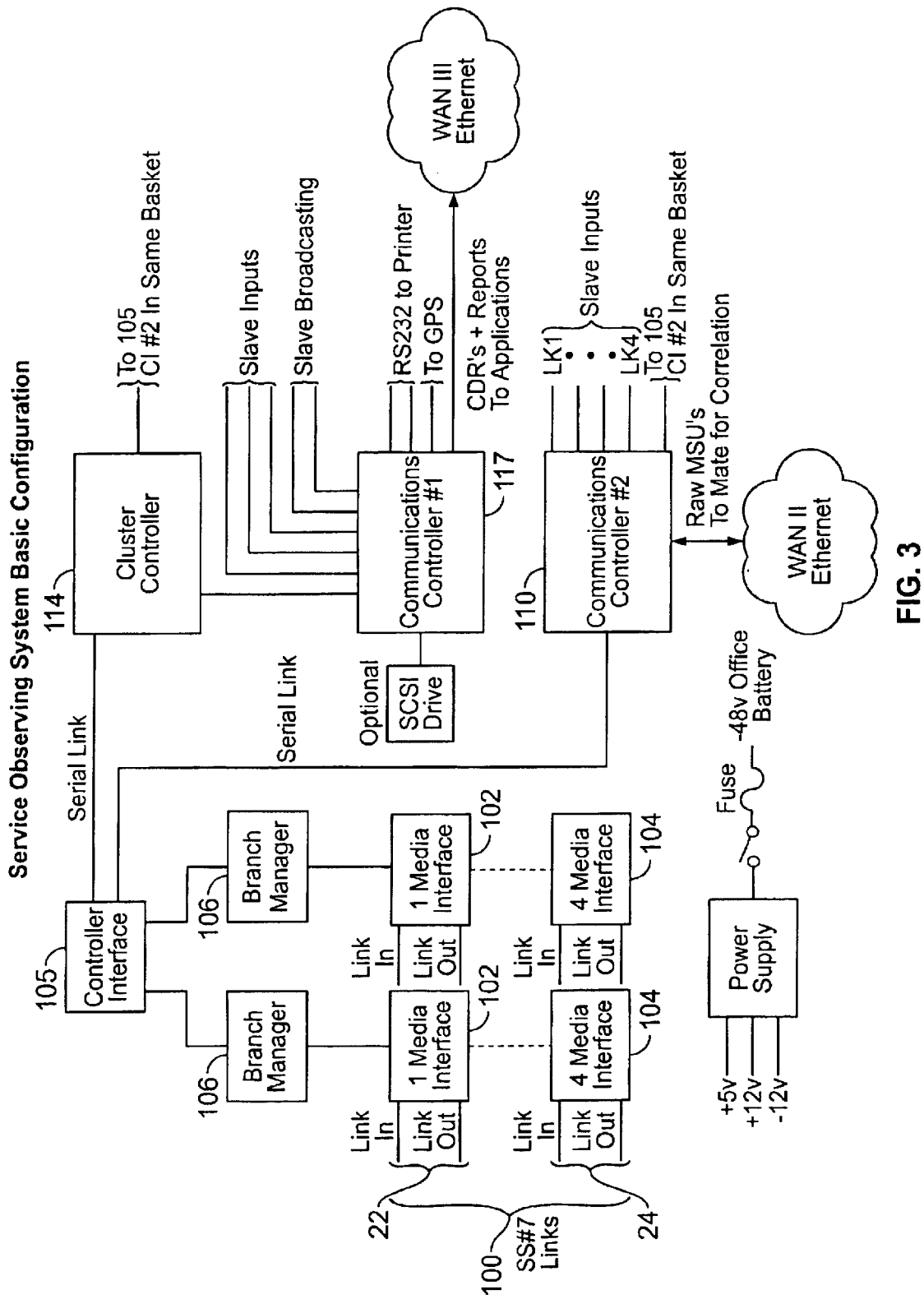
FIG. 3 is a block diagram showing the inventive service observation system and explaining how FIG. 5 of U.S. Pat. No. 5,438,570 is modified for communicating over high speed wide area networks.

FIG. 3 shows a block diagram of the service observation equipment. Primarily, this figure is copied from FIG. 5 of U.S. Pat. No. 5,438,570 with a deletion of the voice paths and other features which are not required in the pure SS#7 data network portion as distinguished from the telephone network as a whole.

The SS#7 high speed data links (such as 22, 26) are connected at 100 on the left side of FIG. 3. Each link connection is made via a media interface printed circuit board (e.g., data link 22 is connected via media interface 102). These interface printed circuit boards are controlled via a controller interface 105 and two branch managers 106 which coordinate signals. In effect, the branch managers over sees and throttles the flow of data, filtering out the irrelevant and passing the required data while still in a packet form.

The design of the branch manager 106 is more or less identical to the design of a controller interface 105, but with less memory. The branch manager is positioned between the media interfaces 102 and 104 and the controller interface. The controller interface 105 has added memory in order to increase the capability of processing messages from 2500 CIC's (Circuit Identification Codes) to 126,000 CIC's simultaneously into Call Records. In doing so, the controller interfaces 105 major task is to decode data packets into "data blocks".

Data Flow Across Two Mated Service Observing Systems

Figure 2:
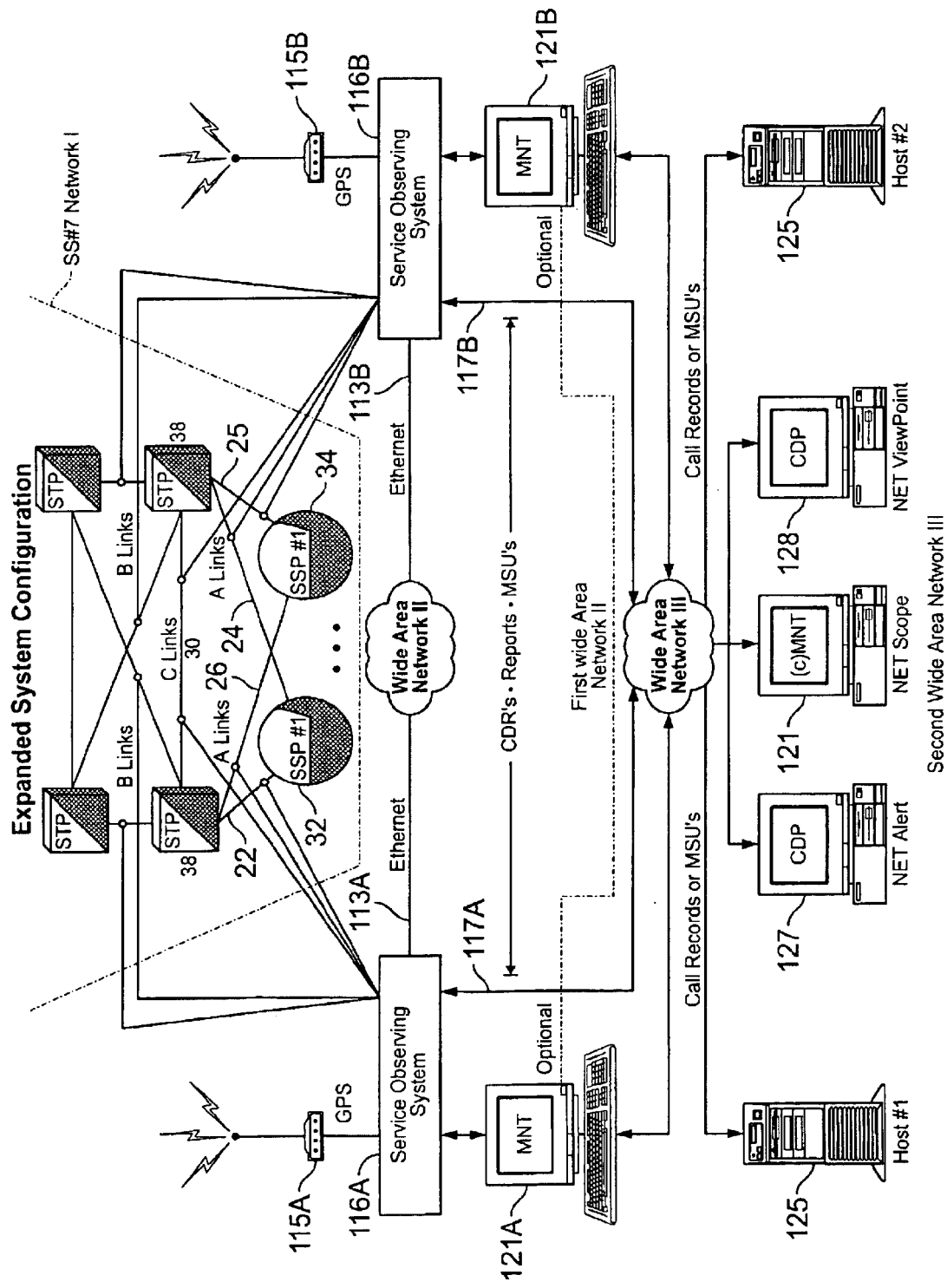
FIG. 2 is a similar block diagram showing how the invention service observation system is interconnected into a network of high speed SS#7 data link networks and wide area networks associated with STP's.
Figure 3A:
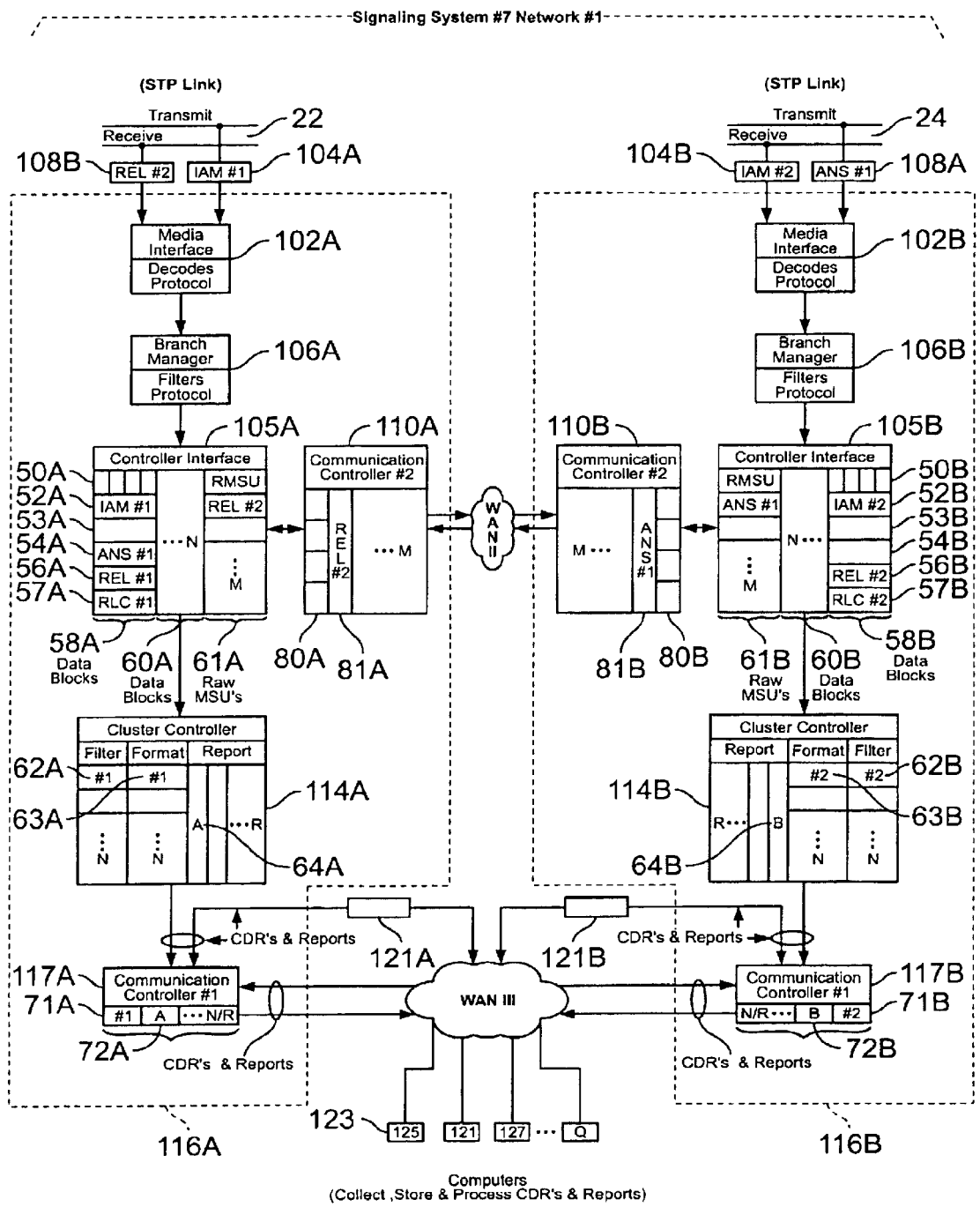
FIG. 3A is a flow chart showing how data is handled in the inventive service observing system to correlate MSU's across two STP's.

FIG. 3A depicts the data flow of SS#7 packets through the invented system of FIG. 3 connected to the Signaling System Network #7 and wide area networks II & III in FIG. 2 in order to demonstrate how the invention solves the problem of correlating SS#7 call set up data (SS#7 data packets) located at two STP's which might be hundreds of miles apart, for example, into a unified, usable and comprehensive format for performing real-time applications like in-progress fraud detection, credit validation and maintenance analysis.

In FIG. 3A, assume the Service Observing Equipment 116A is located at STP 36 in FIGS. 1 & 2 and is only monitoring SS#7 link 22. An identical Service Observing Equipment 116B is located at STP 38 in FIGS. 1 & 2 and is only monitoring SS#7 link 24. Also assume that an initial address message IAM #1 (104A) representing the start of an outgoing call from switching point 32 appears on the transmit side of Link 22.

The media interface 102A decodes this data packet as valid SS#7 data and sends it to the branch manager 106A. The branch manager 106A filters the IAM #1 (104A) as being desirable data for a pre-scheduled filter study. Assuming that it is desired, the IAM #1 (104A) is sent to the branch interface 105A.

Upon receipt the branch interface opens call "data block" (file) 58A in memory and under a unique address 50A decoded the content of the IAM #1 (104A) content, which the controller interface 105A stores in a completely decoded fashion in slot 52A. Subsequent message signaling units MSU's decoded with the same unique address as 50A are stored chronologically in the same Data Block 58 A in slot 53A etc.

Simultaneously additional IAM's representing the start of other incoming or outgoing calls could be decoded from link 22 and additional data blocks (files) N, designated by 60A may be opened in memory for each call to store their related and decoded Message Signaling Units.

Assume simultaneously the start of an incoming call to SP 32 appears on link 24 as IAM #2 designated as 104B . As previously described, media interface 102B in service observing equipment 116B located at STP 38 determines the validity of the MSU as an SS #7 packet and sends it to the branch manager 106B for filtering. Assuming all IAM's are desired, upon receipt controller interface 105B would open a call data block in memory 58B under the unique address 50B plus completely decode and store the IAM #2(104B) content into slot 52B.

Subsequent related call set up MSU's are stored in a chronological fashion in 53B. Simultaneously additional MSU's representing other incoming and outgoing calls to SP32 may be decoded from link 24 and data blocks opened for each of an N number of calls in memory designated by 60B. It is to be noted that branch interfaces 105A and 105B are equipped with adequate memory to assure data blocks are available for all calls appearing on links 22 or 24 at the maximum capacity of the links, thereby assuring no loss of call data and correlation of all MSU's related to each call set up in a real-time fashion.

As mentioned previously, because of the load sharing capabilities of the STP's and SP's, half the MSU's representing SS#7 call set ups to and from SP32 appear on link 22 and on the other half on link 24. This means that service observing system 116A encounters MSU's requiring transmission to service observing system 116B for correlation into a data block initiated by an IAM. Service observing 116B requires transmission of MSU's to system 116A for correlation. The ability to perform this functionality in real-time (less than 10 ms) is an important feature of this invention.

Assume the outgoing call initiated with IAM #1 (104A) and detected by service observing system 116A results in an answered condition. An Answer MSU, ANS #1 (108A) is detected over link 24 by the media interface 102B of service observing system 116B and filtered down to controller interface 105B by branch manager 106B. The controller interface immediately attempts to correlate the address of the Answer MSU with the address 50B of an open data block. If none is found, it is assumed that the related initial address message IAM is located at the mated service observing system 116A so that the controller interface sends the raw answer MSU, ANS #1 or 108A, to communication controller #2 110B which assigns a unique routing label 80B and stores the raw answer MSU in buffer slot 81B for instant transmission.

Communication controller #2 110B communicates over wide area network II with communication controller #2 (110A) at 10 mb/s using an Ethernet TCP/IP SOCKETS protocol; Upon receipt of the raw Answer MSU, the communication controller #2 (110A) decodes the assigned routing label and sends the raw MSU to the appropriate controller interface 105A. Controller interface 105A views the incoming raw ANS #1 MSU as if it were coming from its related media interface 102A and branch manager 106A. Therefore, controller interface 105 immediately attempts to match the incoming MSU with address 50A of an open data block, thereby attempting to insert it chronologically in slot 54A of data block 58A.

Similarly, assume that the incoming call detected by service observing system 116B results in an incomplete disposition due to a switch blockage (SBI) condition. The release MSU REL#2 (108B) is detected by media interface 102A on link 22. Once again, controller interface's 105A inability to correlate the REL#2 with any open data blocks in memory forces it to send the raw MSU to communication controller #2 (110A) for an assignment of a routing label and a transmission over wide area network II to communication controller #2 (110B) for routing and eventual correlation and decoding by controller interface 105B for storage in slot 56B of data block 58B.

Simultaneously any M number of raw MSU's may be transmitted between communication controllers 110A and 110B in an effort to correlate all raw MSU's in real-time into their respective data blocks in a decoded format. Call data blocks 58A and 58B remain open until they receive their respective release REL and release complete RLC messages. In a similar fashion, slots 56A and 57A plus 56B and 57B are populated, respectively. At such time, the entire data blocks's decoded contents in 58A and 58B are sent to cluster controllers 114A and 114B respectively for further processing. The space in the memory is also available to accommodate other calls.

It should be noted that the MSU correlation scenarios described above occur in less than 10 ms of time following a detection of the MSU at links 22 or 24. Therefore, the combined decoded data content of all the data blocks such as 58A and 58B truly represented the in-progress call set up status of the monitored Signaling System #7 Network at any one moment of time.

At any moment of time, the real-time, up to date status, of the data blocks which contain all the decoded parameter of all related MSU's in a call set up lends itself to be analyzed on numerous occasions during the existence of a call without altering the data collection process.

As such, interim ZIP records or a snapshot of the data block may be generated in response to an occurrence of such thresholds as the receipt of the initial address message (IAM) correlation of the Answer Message, matching a "Hot" calling, called or charge number in conjunction with a long billing duration while the call is still in-progress. Similarly calls may be trapped in real-time based on their called number in the initial address message to trace the route in an SS#7 Network may take in setting up a call and troubleshooting failures while the calls are in-progress.

The cluster controllers 114A and 114B store predefined complex filter criteria 62A and 62B respectively for each user created study in order to apply to interim or completed data blocks 58A and 58B received from the controller interfaces. Associated preconfigured formats 63A & 63B consist of select SS#7 parameters from the data block for outputting custom call data records to the communication controllers #1 (117A & 117B) respectively from data blocks surviving filtration.

Any number of N filters and reformatters may be running simultaneously. In addition the cluster controllers 117A and 117B count predefined SS#7 parameters of their respective data blocks surviving filtration in order to create and store a host of statistical reports in slots 64A and 64B respectively for outputting to the communication controllers every 15 minutes, hourly, daily, weekly and monthly. Any number of suitable reports may be stored and running simultaneously.

Communications controllers #1 (117A and 117B) control the storage and transmission of surviving filtered and reformatted called detail records and statistical reports in slots 71A/72A and 71B/72B, respectively. Any number of call detail records or reports could be stored and staged for transmission to any local 121 or remote computers 123 at 100 or 10 mb/s over wide area network III via Ethernet TCP/IP SOCKETS or FTP protocol for further processing of SS#7 ZIP records, call detail records, and statistical reports into custom real-time fraud detection, credit validation and maintenance analysis applications plus real-time graphically displayed alarms and consolidated longer-term statistical traffic summaries etc. (125, 127 Q).

FIG. 1 is a system which applies the principles of the SS#7 network to a telephone network. FIG. 2 is a expanded system for providing a similar service observing by communicating over a wide area fiber optic networks (here labeled "Wide Area Network #II" and "Wide Area Network #III", by way of example).

The links of FIGS. 1 and 2 are coupled to the SS#7 links 22, 24 via the inventive circuits 116 which are here labeled "Service Observing System." These circuits 116 are individually connected to receivers 115 to detect time signals transmitting by; the global position system ("GPS"). Therefore, whenever the service observing analysis system detects a data packet with the IAM address of the call, that packet is data and time stamped responsive to the signals which receiver 115 receives from the GPS satellite.

The service observing analysis system 116 is connected to fiber optic network #II via a link 113. The data between service observing systems is transmitted at the ethernet, protocol, which is a strict procedure required to initiate and maintain communication.

The service observing systems 116 are connected to network #III via direct links 119 and via optional computers 121. The inventive service observing system includes a number of internal modified personal computers 123 and provides call data collection "host" 125 and a number of computers 127 here labeled "Net Alert", "Net Scope", and "Net View Point." These computers are commercially available from the Tekno Industries, Inc. of Bensenville, Ill. 60106.

Figure 4:
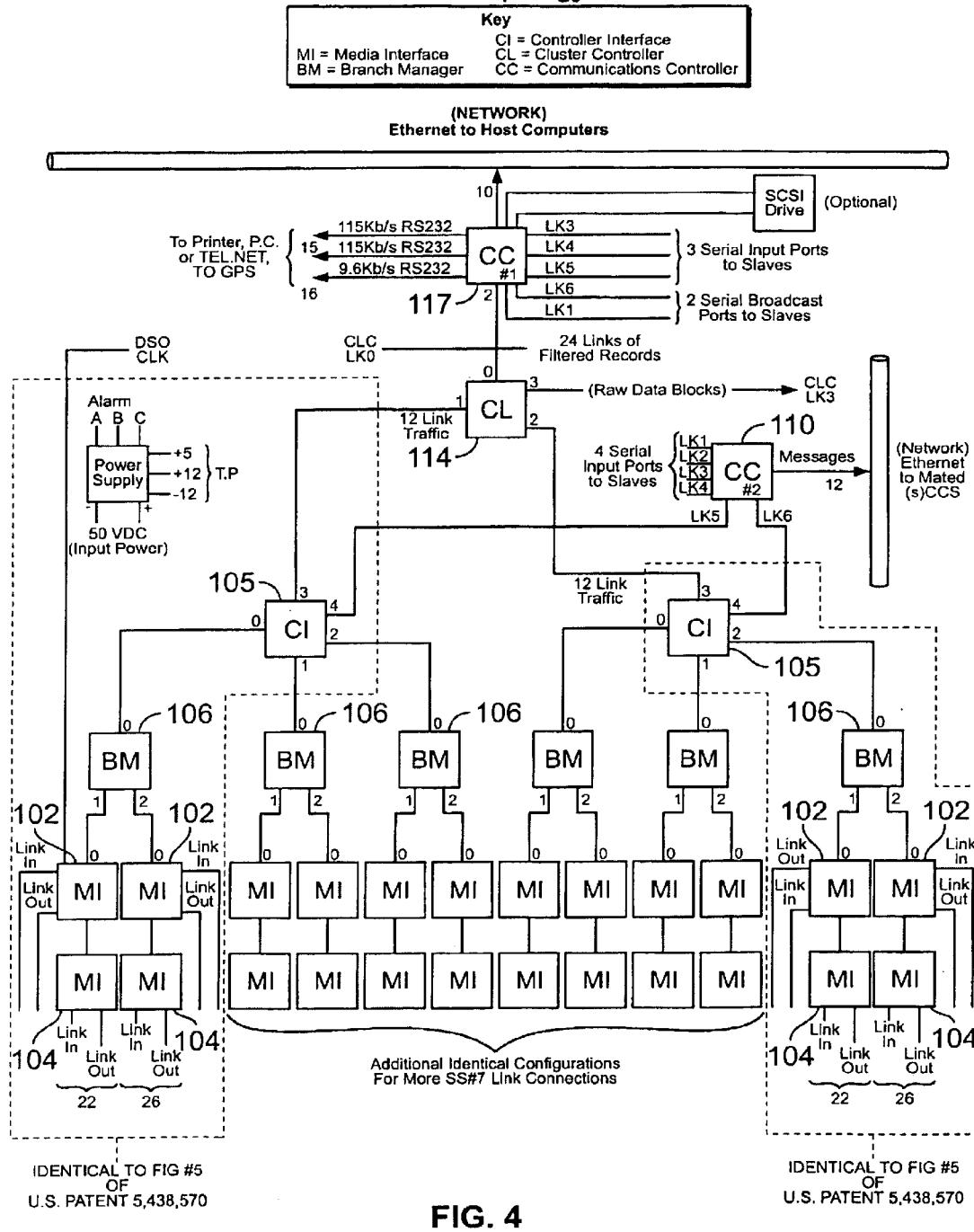
FIG. 4 is a drawing of a pyramidal arrangement of computer interface means for interconnecting high speed SS#7 and wide area networks to the invention service observation equipment.

FIG. 4 shows the pyramidal configuration of the service observing system processor for processing calls on any of many SS#7 links to the service observing equipment computers. More particularly, a controller interface means (CI) 105 in FIG. 4 is coupled to serve an individually associated group of branch manager mean (BM) 106. A cluster controller means (CL) 114 is coupled to control a group of controller interface means (CI). A call data recording means is coupled to cluster controller (CL) in order to accumulate and to record in real time data appearing on the data links. At least one triggering event causes a reading by the controller interface of accumulated and recorded data relative to each one of the data links, without regard to a stage of a call relating to the read data.

A service observing system for a network of high speed SS#7 data links is connected to the SS#7 data links carrying data packets between at least switching points and signal transfer points (A links) and switching transfer points (B-Links), data links carrying data packets. Each data packet contains an address which identifies it as being related to a specific call in progress in the network. All data packets appearing on the coupled link are stored in real time according to the addresses, and in chronological order responsive to the time stamp. The data is accumulated in a call data block memory and is read out immediately responsive to a triggering event during the call and while it is in progress.

To accomplish this, the inventive system uses media interface 102 & 104, (FIG. 3) branch manager (106), and controller interface (105) technology that is described in connection with FIG. 5 of U.S. Pat. No. 5,438,570 and patent application Ser. No. 09/098,045. However, these circuits have been improved and expanded to handle a greater number of SS#7 links in a single and multiple interconnected service observing systems for up to 288 links. A new protocol has been developed to enable two or more call service observing systems to communicate with each other in "real-time".

In greater detail, FIG. 2 has dot-dashed lines which are used to separate the system into the SS#7 system I, a first wide area network II, and a second wide network system III Actually, the customer supplies the three networks. This showing is conceptual since it may represent different configurations of either the same network equipment or totally different network equipment. For example, either or both wide area networks might be unused capacity in the SS#7 system; or the networks could be totally different equipment; or they could be some kind of private network or networks. The external computers scattered throughout the services observing system are operated by comparable software that is also distributed throughout the scattered locations.

The data taken from the signaling system #7 in any of the scattered locations is stored in a "service observing system" 116. As indicated in FIG. 2, two or more of these "service observing systems" may be mated via a wide area network, as two of these systems 116A and 116B are here shown as being mated via the "First Wide Area Network II".

Normally, the data derived from packets in the SS#7 system are formed into data blocks and are stored locally (e.g. at 116A) in real time (i.e. as the data is received). However, sometimes, the data cannot be correlated locally. Then, the data is transmitted through the first wide area network II to a mated service observing system 116B where it can be correlated and stored. This data will be transmitted as raw MSU packets.

The reason why a data packet can not be stored locally is irrelevant. However, usually, the reason is that some other service observing system 116 became involved earlier in the call or translations set up.

Figure 5:
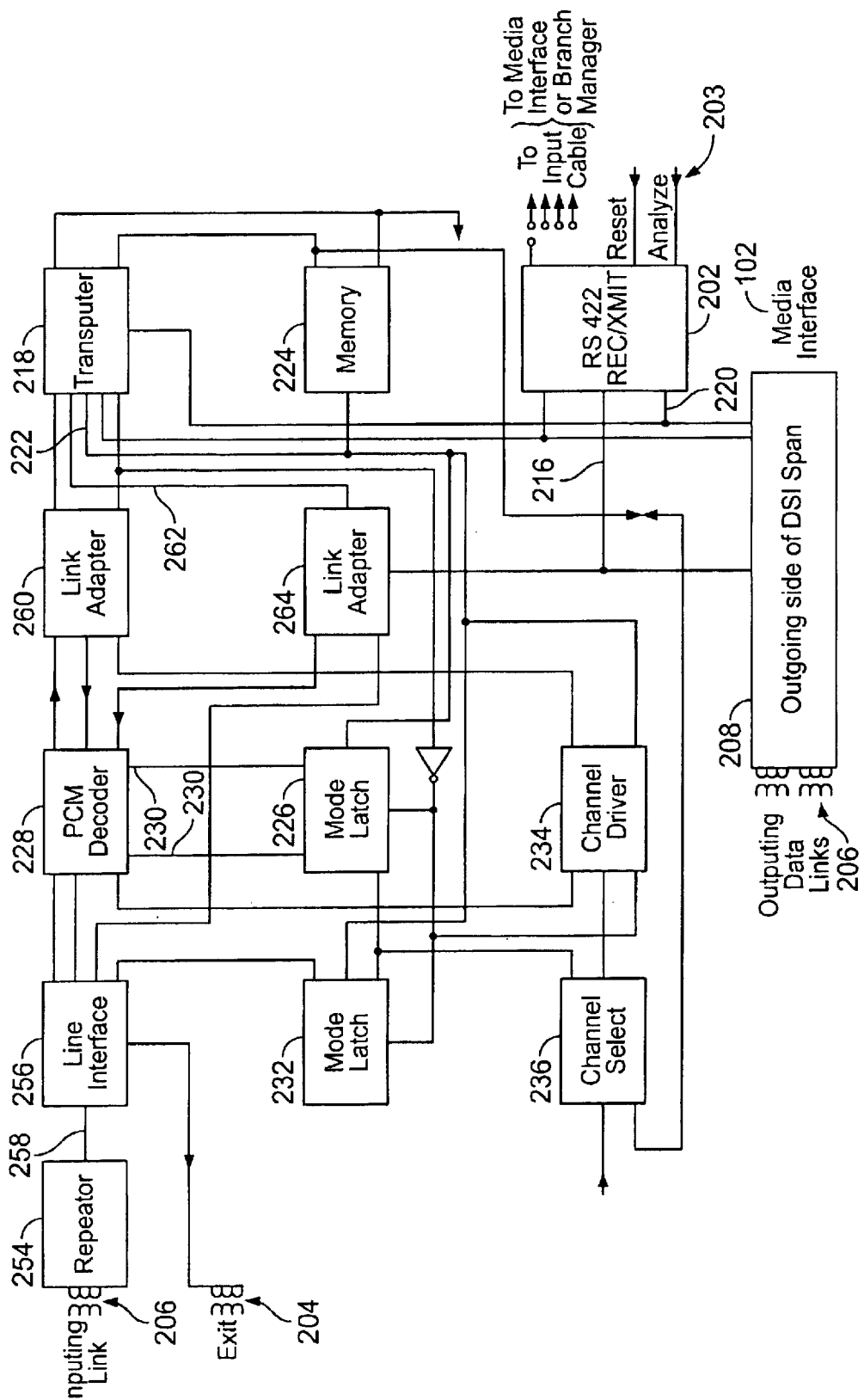
FIG. 5 is a block diagram showing how FIG. 6 of my earlier patent is modified to practice the present invention.

A module called a communication controller 117 (CC) (FIGS. 8 and 9) takes the place of the modem interface (110) and bus interface (120) modules in FIG. 5 of U.S. Pat. No. 5,438,570. The communication controller enables communication between the service observing systems 116 (FIG. 3) and other application processors (such as P.C.'s) via conventional public and private local area and wide area networks using conventional packet protocols such as the ethernet TCP/IP, which is named for two of its most important protocols: transmission control protocol (TCP) and Internet Protocol (IP). The protocol TCP/IP provides standardized connection schemes (rules) and hardware utilization between remote applications that share data.

Figure 7:
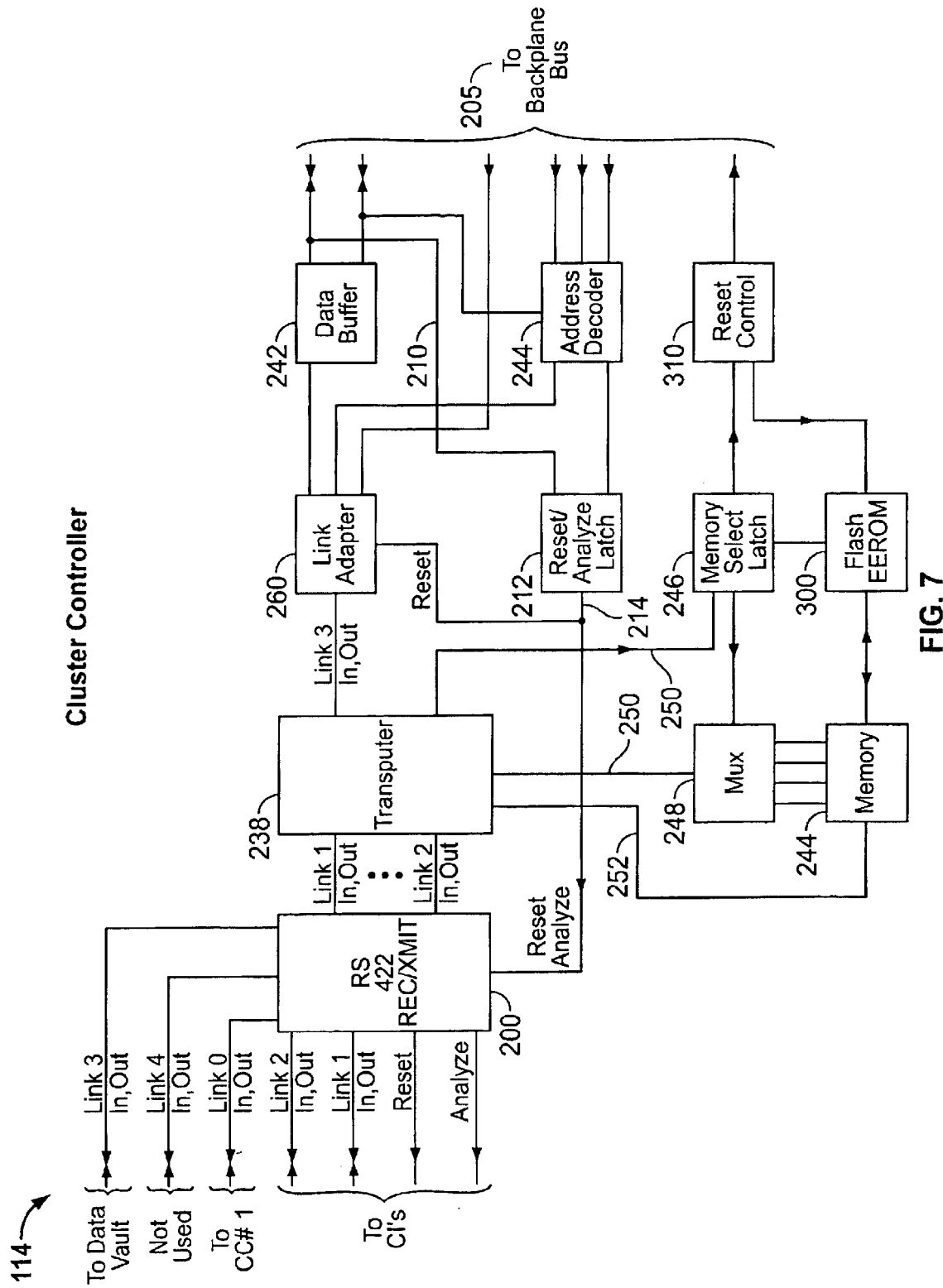
FIG. 7 is a block diagram of a cluster controller.

The cluster controller 114 (CL) described in FIG. 7 is identical to the controller interface in FIG. 7 of U.S. Pat. No. 5,438,570 except that "flash EEROM" (300) has been added to permanently store system defaults, user set ups, plus filter and study configurations. In addition, reset control 310 circuit has been added to "reset" all microprocessors in synchronism responsive to a reset signal. The reset signal is transmitted via the "backplane bus" 205. This reset control circuit 310 also addresses information from the "flash EEROM" 300 when it receives a request from the Processor 238.

Figure 8:
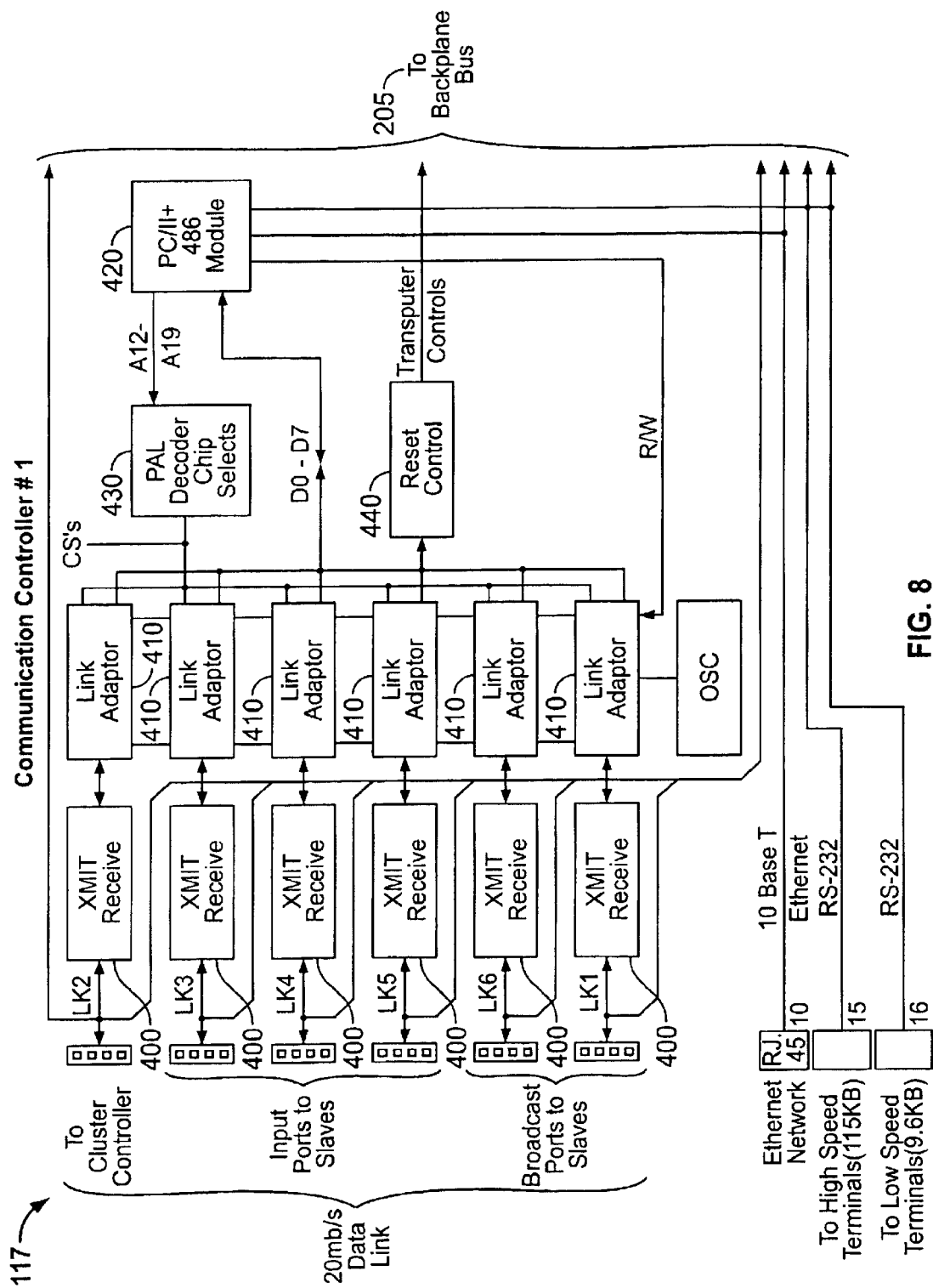
FIG. 8 is a block diagram of a first communication controller.
Figure 9:
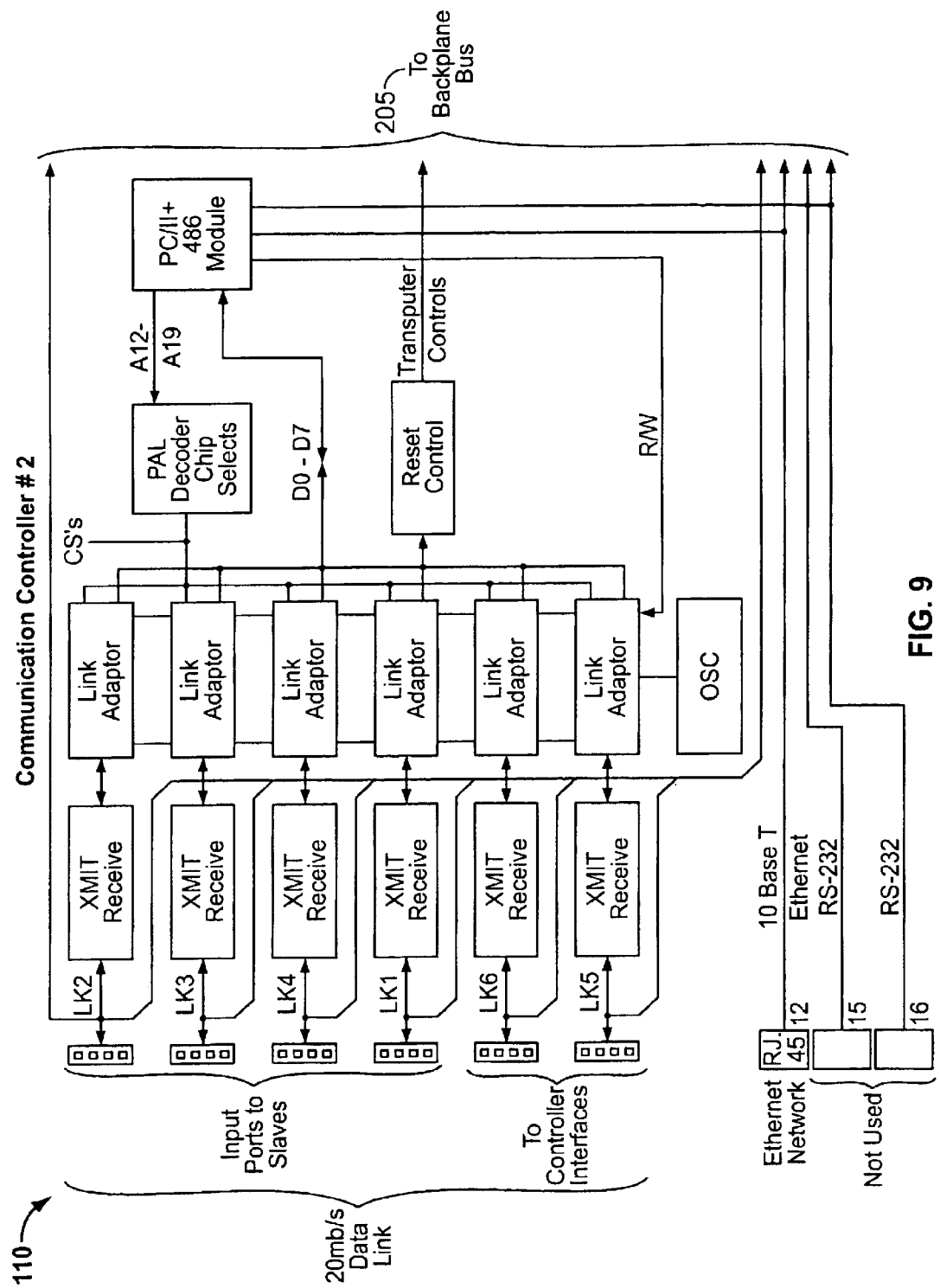
FIG. 9 is a block diagram of a second communication controller.

The communication controllers 117 ("CC") described in FIGS. 8 and 9 have six (6) processors 400 and link adapters 410 which convert serial data received from up to six 20 Mb/s links extending to other microprocessor modules. The conversion is from serial data for communications with the P.C. 420 which, in turn, converts the parallel data it receives into an ethernet TCP/IP packet protocol for transmission over a wide or local area network (LAN).

The primary application of communication controller #1 117 in FIG. 8 is to transmit the completed call detail records and statistical study results received from the cluster controllers 114 (CL) of FIG. 7 over links LK2, LK3, LK4, and LK5 to other Host's or P.C.'s on Network #III (FIG. 2). This transmission is via the second wide area network III, which may be the ethernet accessed through link 119 (FIG. 2). The transmission also provides a communications interface for a user's maintenance and networking terminal running the service observing system 116 graphical user interface.

Configuration information, such as set up and filter structures, which are received from a remote location may be broadcasted to other slave service observing systems 116 via the input and output serial links LK1 and LK6, respectfully, (FIGS. 4 & 8). It also provides networking capabilities for up to three "external" slave call completion analysis systems via serial data links (LK3, LK4 and LK5) for receiving the output signal from the cluster controller's (CL) 114 outputs and multiplexing their data onto Network #III (FIG. 2).

Communication controller #2 (FIG. 9) is used to provide correlation communications over the first wide area network II, which might be the Ethernet network in FIG. 2 which extends between mated communication controller 110 in service observing systems 116 (FIG. 8) located at facilities which are remote from each other. Communication controller #2 may service up to two controller interfaces 105 (Cl) within its own card basket via the serial 20 Mb/s links LK6 and LK5. In addition, the communication controller #2 provides networking capabilities for up to two (2) additional external slave call completion analysis systems 116 via links LK2, LK3, LK4 and LK1 in order to provide "multiplexed" MSU correlation communications.

A card basket is a 19" or 23" rack mounted aluminum housing with a multi-layer printed circuit card backplane and with a row of connectors which permit a plugging in of other smaller printed circuit cards for the purpose of electronically interconnecting them and interfacing wiring from various monitoring points in the switching exchange (STP or SP).

In conjunction with the service observing system 116, three P.C. based software applications have been developed which are here called NET Alert, NET Scope and NET View Point. These devices assist in the intricate functionality of the service observing system 116 in performing centralized fraud detection, billing audits, quality assurance, protocol analysis, performance alarming, traffic measurements, and network management applications from data collected at the STP's or SP's.

DETAILED DESCRIPTION OF THE INVENTION

FIG. 4 shows a pyramidal topology of a 24 link service observing system 116 for processing data from many links connected to the service observing equipment. More particularly, the service observing system includes an expanded pyramid of RISC ("Reduced Instruction—Set Computing") microprocessor modules interconnected via 20 mc/s. serial links for both communications and performing parallel processing. "RISC" microprocessors have fewer fast executing instructions and more general-purpose registers than other microprocessors. The best way to write a fast code is to maximize the number of operations performed "on-chip" and minimize the number of accesses to data stored in memory. More registers make this goal more attainable. Register accesses are nearly instantaneous; memory accesses take time; thus, at least in theory, RISC can operate faster.

Each box in FIG. 4 represents a processor module which has a specific function in the decoding, correlating and processing of SS#7 message signaling units (MSU's). This distributive processing hardware and software structure also assures 100% throughput without losing data while decoding and correlating all MSU's from a great number of SS#7 links, all operating at about 40% occupancy. This throughput composit is required to create custom call detail records in "real-time" as it is received from the SS#7 network without losing pertinent data.

The media interface (MI) means in the form of module 102 (FIG. 5) physically connect non-intrusively to the tip and ring (T&R) lead incoming (A) and outgoing (B) sides of a "T" Span and/or 56 Kb/s. or 64 Kb/s. data circuit (206 and 204) in order to extract and decode all the signaling system #7 MSU's and then to transmit them over a 20 mb/s. serial link to an adjacent media interface via transceiver (202). The adjacent media interface MI 104 (FIG. 4) decodes the MSU's from a second SS#7 Link and combines them with the MSU's from the first media interface via (102) and then sends them onto a 20 mb/s. serial link to a branch manager (BM) module 106 (FIG. 3). The branch manager 106 (BM) is identical to the controller interface (CI) 105 of FIG. 6.

Branch manager 106 (BM) software now handles SS#7 data from up to 4 media interfaces (MI) simultaneously. In accordance with a pre-loaded program from the cluster controller (CL) 114, the software filters out and discards the fill in signal unit ("FISU"), MSU's which are fillers, plus filters and passes on the MSU's of selected protocol levels ISUP, TCAP, IS41, etc., with their data content to the controller interface (CI) (FIG. 4) module 105. The SS#7 protocol requires that operational links never be void of messages, consequently FISUs are inserted between application data to accommodate the requirement for operational synchronization.

The "octets" counts of all MSU's associated with each SS#7 link are also transmitted to the cluster controller (CL) 114 from the branch manager (BM) 106 for processing into graphics and statistical reports.

| Typical ISUP Call Set up Messages MSU's | |
|---|---|
| <IAM> | Initial Address Message |
| <ACM> | Address Complete Acknowledgement Message |
| <ANS> | Answer Message |
| <REL> | Release Message |
| <RLC> | Release Complete Message |
| <SUS> | Suspend Message |
| <COT> | Continuity Message |
| <RSC> | Reset Circuit |

Means are provided for collecting and accumulating data derived from MSU's into call records. More particularly, the signals from the global position system (GPS) are received by receiver 115 (FIG. 2) of the communication controllers (service observing systems #1). The FIG. 4 controller interface (CI) 105 time stamps all incoming MSU's with a 10 ms. accuracy and handles the MSU's from 3 branch managers (BM) 106 simultaneously or 12 media interfaces in its own chassis, plus the MSU's from its mated controller interface (CI) in service observing system located in its mated STP switch.

Generally, the MSU data includes information which may be used to find the calling number, character number, originating and destination point codes, circuit identification codes, and the like.

Counting means count the MSU's by protocol types. Means responsive to the count is located in this counting means for generating at least one real-time report from a group of reports including synchronization reports, link occupancy of graphs, alarms, average and peak occupancy statistics, message type counts, minutes of use count, point code to point code MSU reports, the reports being given on at least one of link.

Figure 6:
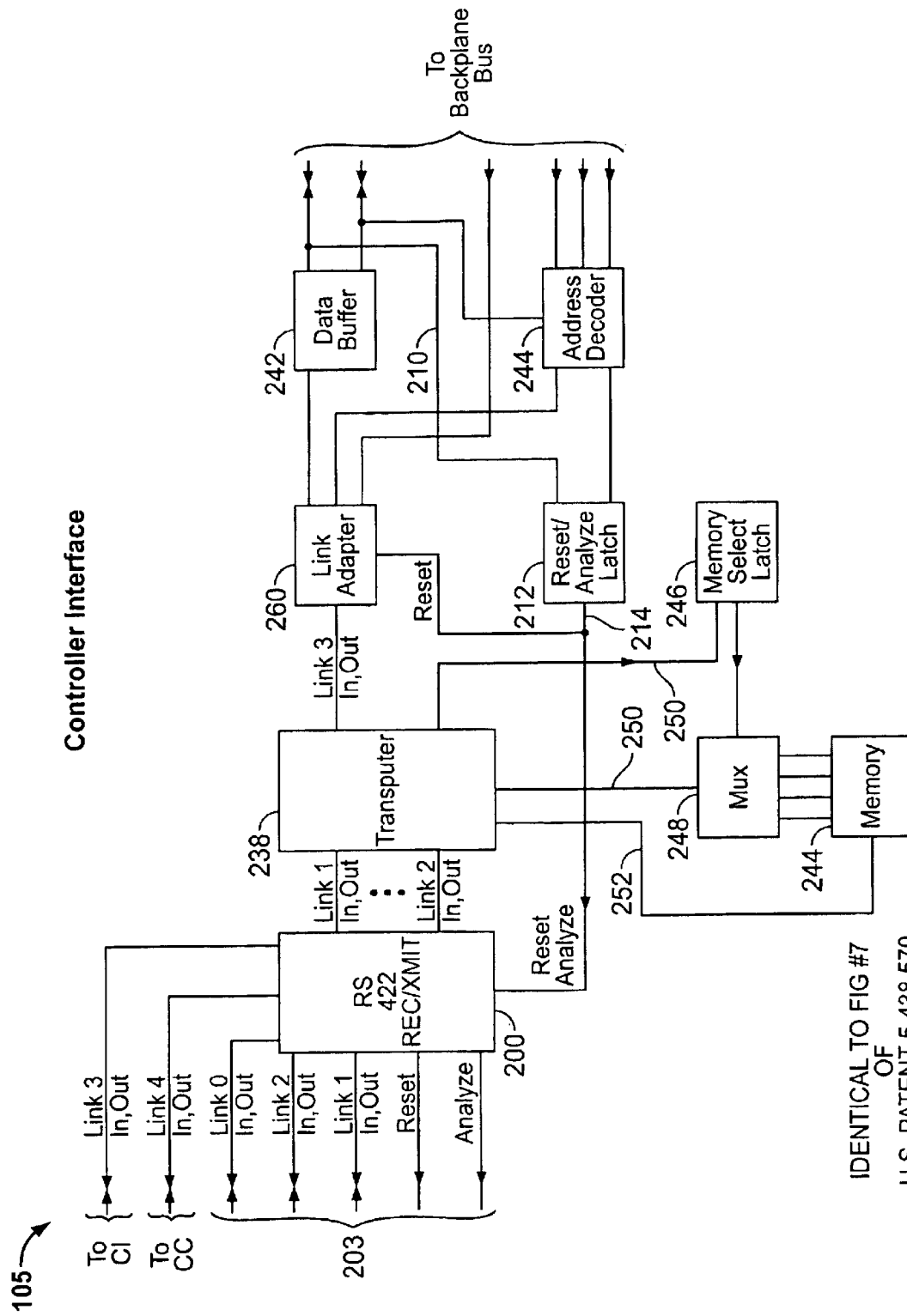
FIG. 6 is a block diagram showing how the controller interface in FIG. 7 of my earlier patent is modified to practice the invention.

FIGS. 5 and 6 show the circuits which interface between the monitored SS#7 channels and the FIG. 4 communication controller. More particularly, FIG. 5 shows the media interface 102. FIG. 6 shows the controller interface 105 or branch manager 106. The controller interface 105 (FIG. 6) communicates with the cluster controller module (CL) 114 (FIG. 3). In the upper left hand corner of FIG. 6 and lower right hand corner of FIG. 5, a circuit designated RS422 Rec/xmit circuits 200, 202, respectively, are coupled together via a high speed serial data bus 203 so that the controller interface (CI) 105 and 106 (FIG. 6) and media interface (MI) 102, 104 (FIG. 5) may work as a unit.

The high speed data links 22, 26 are coupled to the media interface (MI) 102, 104 (FIG. 6) via transformers 204, 206 (FIG. 5). The outgoing side block 208 indicates a circuit which monitors the outgoing side of the SS#7 link or the send leg that is identical to the incoming side or receiving leg (which is the same as everything shown in FIG. 5).

The manufacturer supplies the circuit of FIG. 5 on a printed circuit board which is dedicated to a particular system such as a (24 channel) T-carrier. This system uses a standard binary word data packet frame (193 bits in a frame beginning with a "flag."), a T-carrier extended data packet frame or a "CEPT" system (32 channel European standard). As a practical matter, about the only differences between these dedicated printed circuit boards is a capacitor and a crystal which make a different frequency selection for each option. Other interfaces for other equipment such as V35, D50A, DSO, R5232, DSCS are also available.

When the service observing system is first powered up, the cluster controller 114 (FIG. 3) sends codes via communication controller 117 to reset the circuits in FIGS. 5 and 6 via wire 214 (FIG. 6) and the "RS422" circuits 200, 202. In the circuit of FIG. 5, the "RS422" circuit 202 sends a reset signal via wire 216 (FIG. 5).

The reset signal comes into the processor 218, via line 220. This Processor is particularly attractive because its high speed serial link inter communications concept enables any number of multiprocessing configurations for greater processing flexibility and power in achieving somewhat the same objectives. An example of such objectives is a insertion of a branch manager and/or an increase in the number of media interfaces feeding a branch manager or controller, or branch managers feeding a controller-coded information into a "call record", which is the history of a single call.

The call record is put together from the SS#7 protocol's packets of information, such as the IAM, ACM, COT, ANS, REL, etc. These packets or MSU's are detected over any or all the links being monitored.

The controller interface 105 (FIG. 4) operates under the direction and control of Processor 238 (FIG. 7) which, in turn, is under the control the FIG. 4 cluster controller 114 (CL).

The call data block is accumulated in memory 244, (FIG. 6), which is a large RAM or group of RAMS. Each call or transaction data block is accumulated in an individual memory area dedicated to a given call for the duration thereof. The memory area is selected by the processor 238 when it operates a memory latch 246. The memory latch 246 sets a path through the MUX circuit 248 which directs any signals appearing on wire 250 into the memory area 244 which is selected by the processor 238. Periodically, the processor sends refresh signals over wire 252 to the memory 244.

In operation, a call occurs and SS#7 data packets appearing on a 56–64K high speed data link are received at a transformer 206 (upper left-hand corner of FIG. 5). The repeater 254 includes a pair of amplifiers which compensate for low signal levels and provide impedance matching. The data packet clock pulses are extracted from the received signal in order to coordinate the timing on the data link with the timing of the local equipment in FIG. 4. The repeater 254 forwards the received data pulses through the line interface 256, the PCM decoder 228, and finally the pulses are strobed into link adapter 260 and sent on to the processor 218.

The processor 218 coordinates operations by detecting errors in the data packets received from the data links while holding various circuits during the interval while the information transfer is in progress. The errors detected by processor 218 are such things as a premature loss of signal, jitter, too many bits in a data packet, loss of synchronism, and the like. In case an error is detected, processor 218 may release the observation of the data packet.

The information signal is then transferred through link adapter 264 (FIG. 5) and the "RS422" circuit 202 and over the high speed serial link 203 to the "RS422" circuit 200 in the controller interface or branch manager of (FIG. 6) which selects and sends the signal to a call data block storage area in memory 244 that is dedicated to the call under observation. Processor 238 sets the address of such area in latch 246 for the duration of the information transfer for the current data packet. Responsive thereto, the MUX 248 sets a path to the selected memory area 244 identified by latch 246.

After the data packet information received from the high speed data link is stored at the call data block location in memory 244, the circuits of FIGS. 5, 6 go on to simultaneously store other information received in other data packets and relating to other calls. This other information is stored in other memory area locations in memory 244. The process returns to the described call and memory location each time that a new SS#7 data packet with the pertinent address is received from a SS#7 high speed data link.

When the information in a data packet indicates that a call is complete, the processor 238 ships the accumulated call data block information from memory 244 to a suitable memory on the cluster controller location where the call data block is processed into reports and/or custom formatted detailed call records.

In accordance with FIGS. 9A–9C of U.S. Pat. No. 5,438,570, all messages units (MSU's) associated with a single call setup are correlated instantaneously and assembled by the controller interface (CI) 105 (FIGS. 3, 4). In accordance with their link set number, originating and destination point codes, plus circuit identification codes "address", the related MSU are assembled into a single data block for generating customer call detail records and/or summary statistical reports. The data block may be arranged in the following format:

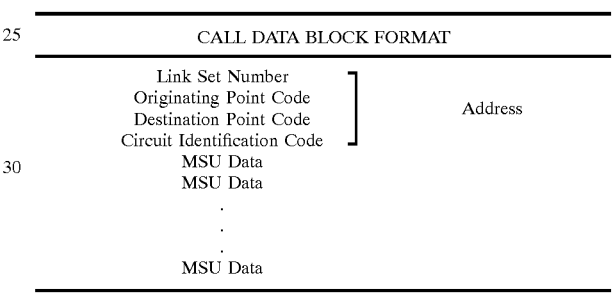

In a similar fashion, MSU's for network queries to data bases consist of, but are not limited to, invoking and resulting messages. These messages are correlated according to their link set number, transaction ID, invoke OPC, return DPC, invoke ID and correlation ID into a transaction data block for generating transaction detail records (TDR's) and statistical reports:

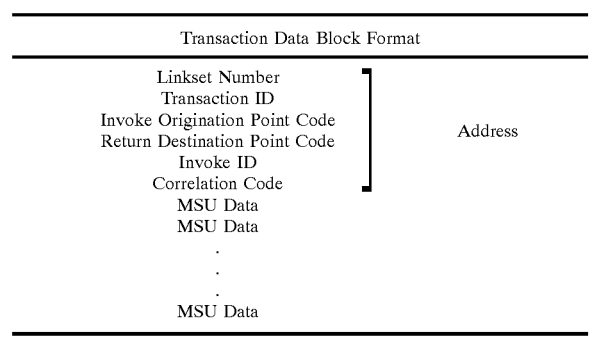

Simultaneously, the Controller Interface (CI) 105 calculates the durations of a series of unique incremental time periods and, together with the decoded MSU's data for each call, applies them to a series of improved and expanded algorithms described initially in FIGS. 9A and 9B of U.S. Pat. No. 5,438,570 for determining the final disposition of a call or transaction. These dispositions will be used later to separate completed calls or transactions (CC) from incomplete calls or transactions, plus normal incomplete calls like busies (BY) and don't answers (DA) from equipment blockages and failures like circuit blockages (CB) or switch blockages (SB) and protocol errors (PE) etc.

The inventive system receives and uses the SS#7 data packets in the following unique disposition algorithms in order to establish the call record's final disposition category.

Disposition Algorithms for ISUP Call Set ups:

Legend:
LS-Linkset
PC-Point Code
CIC-Circuit Identification Code

AB1- Access Barred-an <IAM> was received for a valid LS/PC/CIC combination, and may or may not have been received, no <ANM> was received, and a <REL> was received with a non-normal CAUSEINDICATOR of call rejected, or call blocked due to group restriction.

AB2- Access Barred-an <IAM> was received for a valid LS/PC/CIC combination, an <ACM> may or may not have been received, no <ANM> was received and a <REL> was received with a non-normal CAUSEINDICATOR of bear capability not authorized, or requested facility not subscribed.

BY1- Busy - an <IAM> was received for a valid LS/PC/CIC combination, an <ACM> may or may not have been received. A busy BYI is indicated if no <ANM> was received and a <REL> was received with a non-normal CAUSEINDICATOR of user busy or call block group restricted.

BY3- Busy - An <IAM> was received for a valid LS/PC/CIC combination. A busy BY3 is indicated if a <ACM> may or may not have been received, no <ANM> was received and a <REL> was received with a non-normal CAUSEINDICATOR = Interworking failure, UF5 mapping was turned on and the call duration was between MIN (the minimum UF5 Busy period) and MAX (the Maximum UF5 Busy Period). In this case, the UF5 was altered to BY3 to indicate a probable networking busy type call.

CA1- Call Abandon-an <IAM> was received for a valid LS/PC/CIC combination. A <ACM> may or may not have been received. A call abandon CAI is indicated if no <ANM> was received and a <REL> was received with a non-normal CAUSEINDICATOR and the DA timer had not expired at the cessation of the call. An <IAM> was received for a valid PC/CIC combination. A <ACM> was not received; no <ANM> was received; and a <REL> was received with a normal CAUSEINDICATOR.

CB1- Circuit Blockage - an <IAM> was received for a valid LS/PC/CIC combination. A circuit blockage CB115 is indicated if an <ACM> may or may not have been received; no <ANM> was received; and a <REL> was received with a non-normal CAUSEINDICATOR of no circuit available, or precedence call blocked.

CC1- Call Complete-an <IAM> was received for a valid LS/PC/CIC combination. A call complete (CC) 1 is indicated if a <ACM> may or may not have been received; no <ANM> was received; and a <REL> was received with a non-normal CAUSE INDICATOR, and a <RLC> was received. This is the optimum completed call scenario.

CC2- Call Complete-an <IAM> was received for a valid LS/PC/CIC combination. A call complete CC2 is indicated if an <ACM> may or may not have been received; no <ANM> was received and a <REL> was received with a non-normal CAUSE INDICATOR; but no <RLC> was received.

CC3- Call Complete-an <IAM> was received for a valid LS/PC/CIC combination. A call complete CC3 is indicated if a <ACM> may or may not have been received; no <ANM> was received; no <REL>, and no <RLC> was received.

CC4- Call Complete-same as CC1, but <REL> had a non-normal CAUSEINDICATOR.

CC5- Call Complete-an <IAM> was received for a valid LS/PC/CIC combination, an <ACM> may or may not have been received, and <ANM> was received but a timing problem exists with the reception of either the <REL> or the <RLC> or they have preceded the <ANM>.

CC6- Call Complete-On CCS configurations that involve mating of ISUP MSU's between "Controller Interface" Modules, it is possible for the ISUP MSU decoder to "see" the <RLC> MSU before the <REL> MSU because the <REL> may have to be transferred over the mating network, which may introduce some -continued Disposition Algorithms for ISUP Call Set ups:

small delay. If the user selectable "<REL> timeout" expires and the disposition would have been CC1 through CC5 then the disposition is assigned CC6.

CF2- Continuity Failure - an <IAM> was received for a valid LS/PC/CIC combination, an <ACM> may or may not have been received, a <COT> was received with a "failed" indication.

DA1- Did Not Answer-an <IAM> was received for a valid LS/PC/CIC combination, an <ACM> may or may not have been received, no <ANM> was received and a <REL> was received with a normal release CAUSEINDICATOR, and the DA timer had expired at the cessation of the call or <REL> had a CAUSE INDICATOR with the value no answer.

EO1- Equipment Operation - an <IAM> was received for a valid LS/PC/CIC combination, an <ACM> may or may not have been received, no <ANM> was received and a <REL> was received with a non-normal CAUSEINDICATOR of destination out of order.

EO2- Equipment Operation - an <IAM> was received for a valid LS/PC/CIC combination, an <ACM> may or may not have been received, no <ANM> was received and a <REL> was received with a non-normal CAUSEINDICATOR, of network out of order.

EO3- Equipment Operation - an <IAM> was received for a valid LS/PC/CIC combination, an <ACM> may or may not have been received, no <ANM> was received and a <REL> was received with a non-normal CAUSEINDICATOR of temporary failure.

LMS- Lost or Lone Message-disposition is available to provide the decoding of MSU's other than <IAM> when no Call Detail Record (CDR) "block" exists. Note: The <IAM> initiates the CDR "block", for which all subsequent MSU's are correlated. For example, this condition may occur when all links handling ISUP traffic are NOT being monitored.

MF1- Message Failure-<IAM> was received for a valid LS/PC/CIC combination, an <ACM> may or may not have been received, no <ANM> was received and a <REL> was received with a non-normal CAUSEINDICATOR of address incomplete.

MF2- Message Failure - an <IAM> was received for a valid LS/PC/CIC combination, an <ACM> may or may not have been received, no <ANM> was received and a <REL> was received with a non-normal CAUSEINDICATOR of access information discarded.

MF3- Message Failure - an <IAM> was received for a valid LS/PC/CIC combination, an <ACM> may or may not have been received, no <ANM> was received and a <REL> was received with a non-normal CAUSEINDICATOR, invalid call reference.

MF4- Message Failure - an <IAM> was received for a valid LS/PC/CIC combination, an <ACM> may or may not have been received, no <ANM> was received and a <REL> was received with a non-normal CAUSEINDICATOR of incompatible destination.

MF5- Message Failure - an <IAM> was received for a valid LS/PC/CIC combination, an <ACM> may or may not have been received, no <ANM> was received and a <REL> was received with a non-normal CAUSEINDICATOR of invalid message, or invalid transit network.

MF6- Message Failure - an <IAM> was received for a valid LS/PC/CIC combination, an <ACM> may or may not have been received, no <ANM> was received and a <REL> was received with a non-normal CAUSEINDICATOR of a misdialed trunk prefix.

NA1- No Answer Message - an <IAM> was received for a valid LS/PC/CIC combination, an <ACM> may or may not have been received, no <ANM> was received, ANM wait time expired with no other activity for the call and a <REL> was received with a normal release CAUSEINDICATOR.

NN2- No Ring No Answer - an <IAM> was received for a valid LS/PC/CIC combination, an <ACM> may or may not have been received, no <ANM> was received and a <REL> was received with a non-normal CAUSEINDICATOR of no user responding, an <IAM> was received, the ACM wait time had expired, and no other messages were received.

NR1- No Route - an <IAM> was received for a valid LS/PC/CIC combination, an <ACM> may or may not have been received, no <ANM> was received and a <REL> was received with a non-normal CAUSEINDICATOR of no route to network.

NR2- No Route - an <IAM> was received for a valid LS/PC/CIC combination, an <ACM> may or may not have been received, -continued Disposition Algorithms for ISUP Call Set ups:

no <ANM> was received and a <REL> was received with a non-normal <u>CAUSEINDICATOR</u> of no route to destination.

PE1- Protocol Error-an <IAM> was received for a valid LS/PC/CIC combination, an <ACM> may or may not have been received, no <ANM> was received and a <REL> was received with a non-normal <u>CAUSEINDICATOR</u> of message no implemented.

PE2- Protocol Error-an <IAM> was received for a valid LS/PC/CIC combination, an <ACM> may or may not have been received, no <ANM> was received and a <REL> was received with a non-normal <u>CAUSEINDICATOR</u> of parameter not implemented.

PE3- Protocol Error-an <IAM> was received for a valid LS/PC/CIC combination, an <ACM> may or may not have been received, no <ANM> was received and a <REL> was received with a non-normal <u>CAUSEINDICATOR</u> of invalid parameter.

PE4- Protocol Error-an <IAM> was received for a valid LS/PC/CIC combination, an <ACM> may or may not have been received, no <ANM> was received and a <REL> was received with a non-normal <u>CAUSEINDICATOR</u> of protocol error.

SA1- Service Availability - an <IAM> was received for a valid LS/PC/CIC combination, an <ACM> may or may not have been received, no <ANM> was received and a <REL> was received with a non-normal <u>CAUSEINDICATOR</u> of bearer capability not available.

SA2- Service Availability - an <IAM> was received for a valid LS/PC/CIC combination, an <ACM> may or may not have been received, no <ANM> was received and a <REL> was received with a non-normal <u>CAUSEINDICATOR</u> of service not available or barred by CUG.

SB1- Switch Busy-an <IAM> was received for a valid LS/PC/CIC combination, an <ACM> may or may not have been received, no <ANM> was received and a <REL> was received with a non-normal <u>CAUSEINDICATOR</u> of switching congestion.

SI1- Service Implementation-an <IAM> was received for a valid LS/PC/CIC combination, an <ACM> may or may not have been received, no <ANM> was received and a <REL> was received with a non-normal <u>CAUSEINDICATOR</u> of bearer capability not implemented, or bear capability not presently available.

SI2- Service Implementation-an <IAM> was received for a valid LS/PC/CIC combination, an <ACM> may or may not have been received, no <ANM> was received and a <REL> was received with a non-normal <u>CAUSEINDICATOR</u> of channel type not implemented.

SI3- Service Implementation-an <IAM> was received for a valid LS/PC/CIC combination, an <ACM> may or may not have been received, no <ANM> was received and a <REL> was received with a non-normal <u>CAUSEINDICATOR</u> of restricted digital.

SI4- Service Implementation-an <IAM> was received for a valid LS/PC/CIC combination, an <ACM> may or may not have been received, no <ANM> was received and a <REL> was received with a non-normal <u>CAUSEINDICATOR</u> of service not implemented, or facility not implemented.

ST1- Special Tone-an <IAM> was received for a valid LS/PC/CIC combination, an <ACM> may or may not have been received, no <ANM> was received and a <REL> was received with a non-normal <u>CAUSEINDICATOR</u> of send a SIT sequence (a tone indicating ready to receive a message to be recorded).

UF1- Unspecified Failure - an <IAM> was received for a valid LS/PC/CIC combination, no other activity occurred for this call until a subsequent <IAM> was sent for the same circuit.

UF2- Unspecified Failure - an <IAM> was received for a valid LS/PC/CIC combination, an <ACM> may or may not have been received, no <ANM> was received and a <REL> was received with a non-normal <u>CAUSEINDICATOR</u> with no specified cause.

UF3- Unspecified Failure - an <IAM> was received for a valid LS/PC/CIC combination, an <ACM> may or may not have been received, no <ANM> was received and a <REL> was received with a non-normal <u>CAUSEINDICATOR</u> of preemption.

UF4- Unspecified Failure - an <IAM> was received for a valid LS/PC/CIC combination, an <ACM> may or may not have been received, no <ANM> was received and a <REL> was received with a non-normal <u>CAUSEINDICATOR</u> of resource unavailable or not member of CUG.

-continued

Disposition Algorithms for ISUP Call Set ups:

UF5- Unspecified Failure - an <IAM> was received for a valid LS/PC/CIC combination, an <ACM> may or may not have been received, no <ANM> was received and a <REL> was received with a non-normal <u>CAUSEINDICATOR</u> of interworking failure.

UF6- Unspecified Failure - an <IAM> was received for a valid LS/PC/CIC combination, an <ACM> may or may not have been received, no <ANM> was received, but a timing problem exists with the reception of either the <REL> or the <RLC>. They may have preceded the <ACM>.

UF7- Unspecified Failure - an <IAM> was received for a valid LS/PC/CIC combination, and it was rejected due to a dual seizure condition.

UF8- Unspecified Failure - On CCS configurations that involve mating of ISUP MSU's between "Controller Interface" Processors, it is possible for the ISUP MSU decoder to "see" the <RLC> MSU before the <REL> MSU because the <REL> may have to be transferred over the mating network, which may introduce some small delay. If the user selectable "<REL> timeout" expires and the disposition <u>wouldnot</u> have been CC1 through CC5, then the disposition is assigned UF8.

UN1- Unallocated Number - an <IAM> was received for a valid LS/PC/CIC combination, an <ACM> may or may not have been received, no <ANM> was received and a <REL> was received with a non-normal <u>CAUSEINDICATOR</u> of unallocated number, unallocated destination number, or undefined business group.

UN2- Unallocated Number - an <IAM> was received for a valid LS/PC/CIC combination, an <ACM> may or may not have been received, no <ANM> was received and a <REL> was received with a non-normal <u>CAUSEINDICATOR</u> of number changed.

ZIP- ZIP Information Packet - Normally, call records are not generated by the CCS until the SS7 release message <REL> is received (or the CCS has determined the call is ended). However, the CCS can be configured to produce an immediate notification (ZIP record) when a call setup Initial Address Message <IAM> is received, Acknowledgement Message <ACK> is received and/or Answer Message <ANM> is received and/or a Long Duration is encountered. These early interim notifications are labeled with a ZIP disposition.

Disposition Algorithms for TCAP/IS41 Query Transactions

The Controller Interface (CI) 105 (FIGS. 3, 4) also assembles the TCAP/IS41 Transaction "Data Block." The TCAP or transaction capability application part is an application level protocol used on telephony links for database lookups which are required before the call set-up can be completed. Examples include 800 numbers translations and calling card verification. The transaction data block is used for examining the component and national parameter layers of the SS#7 protocol to determine the final disposition of the TCAP/IS41 Transaction and for the Cluster Controller to generate statistical reports and custom format transaction data records.

1. TCAP/IS41 General Dispositions
   TC1-TCAP/IS41 transaction successfully Completed
   TC2-TCAP/IS41 transaction successfully Completed, but not mated
   RX1-Reply expected, but not received (no other detected failures)
   US1-Unspecified failure
   TC1-TCAP/IS41 transaction successfully Completed, but not mated
2. TCAP Private (IS41) Error Dispositions
   UM1-Unrecognized MIN
   ES1-Unrecognized ESN
   MM1-MIN/HLR Mismatch
   OS1-Operation sequence problem
   RS1-Resource Shortage
   ON1-Operation not supported
   TU1-Trunk unavailable -continued PM1-Parameter error
SF1-System Failure
UP1-Unrecognized Parameter value
FI1-Feature Inactive
MP1-Missing Parameter
TCAP National Error Component & Parameter Indicator Dispositions
UC1-(Return Error)-Unexpected Component sequence
UD1-(Return Error)-Unexpected Data value
UR1-(Return Error)-Unavailable Resource
MC1-(Return Error)-Missing Customer record
DU1-(Return Error)-Data unavailable
TR1-(Return Error)-Take Refused
QF1-(Return Error)-Queue Full
NQ1-(Return Error)-No Queue
TE1-(Return Error)-Timer Expired
DE1-(Return Error)-Data already Exists
UQ1-(Return Error)-Unauthorized request
TQ1-(Return Error)-Not Queued
DN1-(Return Error)-Unassigned DN
ND1-(Return Error)-Notification unavailable to Destination DN
VS1-(Return Error)-VMSR System ID did not match user profile
RU1-(Return Error)-Reason Unknown
AC1-(parameter) ACG Control cause-vacant code
AC2-(parameter) ACG Control cause-out-of-band
AC3-(parameter) ACG Control cause-database overload
AC4-(parameter) ACG Control cause-destination mass calling
AC5-(parameter) ACG Control cause-operation support system initiated
UE1-(parameter) standard User error-caller abandon
UE2-(parameter) standard User error-improper caller response
PD1-(parameter) Problem data-data that caused a problem
PD2-(parameter) returned data-faulty data returned to originator
TCAP/IS41 Reject Component layer Dispositions
RG1-Reject General-unrecognized component type
RG2-Reject General-incorrect component portion
RG3-Reject General-badly structured component portion
RI1-Reject invoke-duplicate invoke id
RI2-Reject invoke-unrecognized operation code
RI3-Reject invoke-incorrect (parameter)
RI4-Reject invoke-unrecognized correlation ID
RR1-Reject return result-unrecognized correlation ID
RR2-Reject return result-unexpected return result
RR3-Reject return result-incorrect (parameter)
RE1-Reject return error-unrecognized correlation ID
RE2-Reject return error-unexpected return error
RE3-Reject return error-unrecognized error
RE4-Reject return error-unexpected error
RE5-Reject return error-incorrect (parameter)
RT1-Reject Transaction portion-unrecognized package type
RT2-Reject Transaction portion-incorrect transaction potion
RT3-Reject Transaction portion-badly structured transaction
RT4-Reject Transaction portion-unrecognized transaction ID
RT5-Reject Transaction portion-permission to release problem
RT6-Reject Transaction portion-resource unavailable
TCAP/IS41 Abort Transaction layer dispositions
PA1-P-Abort-unrecognized package type
PA2-P-Abort-incorrect transaction portion
PA3-P-Abort-badly structured transaction portion
PA4-P-Abort-unrecognized transaction ID
PA5-P-Abort-permission to release problem
PA6-P-Abort-resource unavailable
PA7-P-Abort-unknown reason
PA8-user abort The above dispositions are described by up to a three character symbol which is inserted into the data block as a separate data field upon which to filter.

Next to be described is the operation of the inventive system.

In accordance with U.S. Pat. No. 5,438,670, only one data block is formed for each call in the controller interface (CI) 105 where the initial address message (IAM) is detected. Regardless of where they are detected within the same link set, all other related message signal units are substantially instantaneously directed to the controller interface (CI) 105, with the IAM, for immediate correlation. Similarly, transaction data blocks are formed based on where the first MSU was received over the same link set. Subsequent MSUs are correlated substantially instantaneously into the same data block.

In this manner, event triggers may be established to generate interim in progress call or transaction detail records based on criteria such as, but not limited to, called, calling and/or charge number, receipt of an answer message (ANS), encountering a long billing duration, etc. Regardless of the number of interim records which are generated, the data block remains in the controller interfaces (CI) 105, gathering information until the call is terminated or the transaction is complete, after which the gathered information is transmitted over a 20 mb/s. serial link to the cluster controller (CL) 114 for further processing.

A cluster controller module (CL) 114 handles data blocks formulated by two controller interfaces (CI) 195. It also stores up to 60 filters of complex criteria to apply at the parameters of the received data blocks. Such filters may consist of, but are not limited to, criteria regarding a specific calling, called or charge number or ranges of numbers; the final disposition of a call or transaction; call setup, holding time or billing duration, etc. The cluster controller (CL) 114 also permits custom formatting the surviving calls and/or transaction data block from a filter into up to 60 unique CDR or TDR formats of selected data fields derived from the MSUs appearing in either an ASCII or binary code for transmission to up to 15 remote processor applications.

The cluster controller 114 may also be pre-programmed by the user to employ data blocks surviving specific filter criteria in order to generate statistical summaries over pre-designated times such as, but not limited to, hourly, daily, weekly, or monthly summaries with automatically included start and end date and times. In this manner, statistical reports may be generated based on any fields in the data block such as, but not limited to, a single or range of SS#7 links; single or range of originating or destination point codes; by specific or-range of area codes, exchange number or line numbers; direction; carrier; circuit identification code; disposition, etc.

A series of pre-arranged report formats is provided in the cluster controller (CL) software to enable generating:

Summary Reports

1. ISUP, TCAP & IS41 disposition counts and percentages, on post-filtered data blocks by any SS#7 fields.
2. ISUP, call setup message type and lost message counts and percentages on post-filtered data blocks by an SS#7 fields.
3. TCAP translation type message counts and percentages, including package and component types on post-filtered data blocks by any SS#7 field.
4. IS41 roamer message type counts and percentages on post-filtered data blocks by any SS#7 fields.
5. TCAP OPC to DPC message/octet count matrix (by translation type, by hour, day, week or month).
6. SNM/LSSU message type counts and percentages on post-filtered data blocks by an SS#7 fields.
7. ISUP incoming and outgoing minutes-of-use for completed and incompleted calls by NPA, NPA/NXX, NPA/NXX/LINE or point code.
8. Real-time link occupancy graphical display, including synchronization plus average and peak hourly, by day statistics by link.

When such reports are completed, they may be immediately sent over an S232C port of the communication controller (CC #1) (FIG. 8) or immediately stored in a SOCKET buffer of the cluster controller (CL) 114 (FIG. 3) or in an FTP file on the optional disk drive associated with the communication controller (CC #1) (FIG. 8). In this manner, reports may be automatically retrieved by remote applications with a data base and/or spreadsheet to further process the data and/or use them in conjunction with determining which captured equipment blockage and failure data blocks need immediate investigation.

The communications controller module (CC #1) (FIG. 8) acts as a "traffic cop" for distributing down-loaded software from a remote user's P.C.s for configuring the service observing system 116 (FIG. 2) and passing the configuration information to additional service observing system. The communication controller stores and/or transmits the results of filters (CDR, TDRs and/or statistical reports) to multiple remote hosts 123 and/or users' P.C.s. Communication controller module (CC #2) (FIG. 9) interfaces the controller interfaces (CI) 105 to their mated controller interfaces (CI) 105 in the mated service observing system which is monitoring the mated STP. If necessary, MSUs are instantaneously transmitting from the other half of the link set via Ethernet TCP/IP to the appropriate controller interface (CI) 105 for "real-time" correlation. This real-time functionality is essential for generating interim "in-progress" call detail records CDRs based on pre-defined triggers.

The following unique concept describes how SS#7 messages are correlated in real-time across mated STPs using a new protocol whereby messages (MSUs) related to the same call setup appear on links in the same link set, but at different STPs which may be miles apart.

Referencing FIG. 2, when a call setup is made from SSP (32), the initial address message (IAM) may be generated and sent over the SS#7 "A" links to STP (36) or STP 38. Assuming that it is sent to STP 36, it would appear on link 22 and be detected by service observing system 116B and a data block is opened at that location with an "address" for that link set and point code combination. This data block incorporates an MSU sent from the OPC of SSP 32 to another SSP's DPC and using a specific CIC for voice.

Once again, a responding address complete message (ACM) could appear on either of SSP 36 A links. Assuming that it appears at STP 38 and that service observing system. 116B decodes it, when the ACM is presented to its controller interface (CI) for correlation, no data block with a matching "address" would be found. Therefore, the ACM is immediately sent by the controller interface (CI) 105 to communications controller (CC) #2 (FIG. 9) for transmission over the wide area network II to its mated service observing system 116A. More specifically, the communication controller #2 (FIG. 9) packages the raw MSU into a binary format in a packet with an "address" containing the controller interface 105 ID, link set number, OPC, DPC, and CIC plus a check sum CRC and sends it to CC #2 of the mated service observing system 116A via the Ethernet TCP/IP network at up to 10 mb/s.

The data packet may be formatted as follows:

Controller Interface ID
Link Set Number
Originating Point Code
Destination Point Code
Circuit Identification Code -continued MSU Data
CRC The communication controller #2 (FIG. 2) counts the octets of the packet to verify the check sum (CRC) and upon a count failure requests another transmission.

Upon receiving a successful packet, CC#2 of service observing system 116A decodes the controller interface ID in the "address" and sends the ACM MSU to the appropriate controller interface (CI) 105 via a 20 mb/s. serial link (LK5 or LK6 of FIG. 4).

The controller interfaces (CI) 105 of service observing system 116A (LK5 or LK6 of FIG. 4) are unable to detect that the ACM came from service observing system 116B. Therefore, the controller interface merely decodes the packet's "Address" and correlate the ACM with the appropriate IAM in an open data block as if the MSU came from a branch manager (BM) 106 (FIG. 3). This procedure is repeated in "real-time" with each MSU during the call setup until the call is terminated, at which time the entire data block is sent to cluster controller CL 114 (FIGS. 3 and 4) for further processing. The service observing system 116B does not retain any MSUs in this scenario, thereby enabling a real-time buildup of the call setup in one data block at one point, in the system where in-progress certain events could trigger the generation of interim ZIP call detail records at any time during a call. However, the system is not limited to in-progress fraud detection and prevention, real-time pre-paid billing audits plus an investigation of maintenance problems of the like.

To better understand the full functionality of the cluster controller (CL) 114 (FIG. 3) and communication controller (CC) 110, a brief description will next be given in conjunction with the computers 123 here designated net alert, net scope and net view point and other hosts (FIG. 2).

Filters may be programmed into the service observing system 116A and 116B via a graphical user interface running on a personal computer 121 (here called a maintenance and networking terminal ("MNT")). These computers 121 can be connected locally to a serial 115 Kb/s. RS232 port and/or connected remotely via the Ethernet TCP/IP port of the communications controller 114 (FIGS. 3 and 4). Filter criteria are permanently stored in a flash R.A.M. memory located in the cluster controller (CL) 114 (FIG. 7). and may be automatically activated or deactivated via a schedule to operate on all or selected SS#7 links.

Unique filters are configured for a companion fraud computer (Host #1) 125 (FIG. 2) whereby a custom call detail record format (ZIP INFORMATION PACKET) including the date and time, called, calling and charge number, is immediately transmitted to Host #1 upon receipt of an IAM in a data block. While the call is in-progress, the host analyzes the packet for calls from known problem sources (such as drug dealers) and/or calls of excessively long durations to hot regions.

A second conventional CDR format would also be generated to the Host #1 in response to a receipt of the release and/or release complete MSU which indicates termination of the call. Hence, the total duration of the call is ascertained. In this manner, calls can be prematurely disconnected to prevent a dead beat customer from running up excessive charges, rather than to allow the call to continue and pursue lost revenue after the call is terminated.

Another filter can generate another set of custom formatted ZIP and conventional CDRs for transmission to billing computer host #2 in order to perform real-time pre-paid billing audits while calls are in-progress and to prevent excessive billing due to calls of long duration to expensive locations. The same data may again be used to generate conventional billing invoices. In this manner, calls can be prematurely disconnected immediately upon exhausting a pre-paid credit instead of waiting until the call has ended and then pursuing additional uncollectable billing.

Similarly, another filter can be configured for the same call to simultaneously send a custom formatted conventional call detail record consisting of, but not limited to, the date and time; called, calling, charge numbers; originating and terminating point codes plus final duration and disposition. This data is sent to a central computer such as NET Viewpoint with a relational data base management system in order to sort records and generate daily, weekly and/or monthly traffic engineering, quality assurance, minutes of use and billing verification report.

The service observing systems 116A and 116B determination of a call's or transaction's final disposition enables a configuration of filters in the cluster controller (CL) 114 which zero in on data blocks representing equipment blockages and failures, such as switch blockage (SB), or protocol error (PE). An all-inclusive "Dump 7" format which includes every MSU correlated in the block with its entire contents neatly decoded with English labels, provides information which may be instantly transmitted over either a local area network or a wide area network, for example, to designated maintenance processors such as the "NET Scope" which stores large quantities of E, B and F data blocks over long periods of time for sorting via a data base and/or spreadsheet to perform protocol analysis and troubleshooting of the SS#7 network.

Similarly, triggers such as, but not limited to, specific called, calling and/or called numbers in conjunction with the receipt of an MSU can be applied to a filter in order to generate a ZIP record in a format that facilitates performance of traffic and maintenance analysis of call and transaction routes in real-time and/or tracking, the origination and destination of a criminal's communications while it is being set up.

A series of SS#7 signaling network maintenance (SNM) and link status signaling unit (LSSU) messages (MSUs) are continuously transmitted over the links between STPs 38/36 and SPs 32/34 to provide an indication of the health and status of the SS#7 links. Filters may be configured in the cluster controller (CL) of the service observing system 116A and 116B to trap on decoded SNM and LSSU data blocks with flagrant status conditions and to transmit them in a legible record format, over a private or public network, to a remote processor such as the "NET Alert" in order to distinguish between major, minor and informational alarms and to graphically display these conditions on a network map, generate an audio and/or visual alert signal, and track the alarm's status.

In a similar fashion, the protocol octet data generated over each link and counted by the branch manager (BM) 106 may be transmitted by the communication controller (CC #1) (FIG. 8) every second, if necessary. This transmission is over wide area network III to the "NET alert" (FIG. 2) in order to activate real-time graphical barometers monitoring the synchronization status and occupancy level of all the SS#7 links in conjunction with a network map. Threshold violation of the incoming link synchronization and occupancy data provides a visual indication of major or minor alarms on the map. The users may troubleshoot alarms by an analysis of elements of the "NET alert" barometers or the map in order to obtain bar graph representations of any link or link set in the network and graphical timelines showing a prior and subsequent condition to an alarm. The "NET alert" also inserts the alarm information into a data base for generating statistical maintenance trend reports in the future.

Various modifications which are within the spirit of the invention will occur to those who are skilled in the art. Therefore, the appended claims are to be construed to include all equivalents.

The claimed invention is:

1. A service observing system for a SS#7 network of high speed data links, said system comprising:
    call-completion analysis means including a plurality of media interface means for coupling said system to individually associated ones of said data links which carry data packets, said interface means being arranged in groups;
    a plurality of branch manager means coupled in groups, each of said branch manager means being coupled to an individually associated one of said groups of interface means;
    a plurality of controller interface means, each of said controller interface means being coupled to an individually associated group of said branch manager means;
    cluster controller means coupled to control said controller interface means;
    call data recording means associated with said controller interface means in order to accumulate and record SS#7 network signaling of high speed data links in real time data blocks located at a single location containing data in chronological order from said data links; and
    means responsive to at least one pre-selected triggering event for immediately reading said accumulated and recorded SS#7 network signaling of high speed data links chronologically stored in data blocks without regard as to the stage of a call to which said data applies, where the call may be in progress.

2. The system of claim 1 comprising means for timing and comparing interrelationships between data packets within a data block for developing a final disposition category of information for assignment to said data block,
    said data block being selected from a group consisting plurality of calls, or a plurality of transactions.

3. The service observing system of either one of claims 1 or 2 and means responsive to a preselected triggering event for generating an detailed interim call record responsive to a specific in-progress detection of at least one indication taken from a group consisting of fraud, billing problems, audits, instantaneous maintenance requirements, lost messages, transactional events, traffic conditions, flagrant messages, criminal traffic, hacking, and correlations thereof.

4. The service observation system of claim 1 wherein said cluster controller means are operated responsive to software distributed throughout said service observing system.

5. A service observing system for a network of high speed data links extending between at least switching points and signal transfer points;
    said data links carrying data packets, each of said data packets containing an address which identifies said packet as being related to a specific call or transaction which is in process in said network;

said service observing system comprising:
first means coupled to at least some of said data links for observing all data packets appearing on said coupled links;
second means for accumulating and storing said data packets from SS#7 network signaling of high speed data links in real time and in a data block form, said storage being at locations dedicated to a particular call or transaction in response to said packet addresses, the means for accumulating and storing said data packets being associated with said locations for a duration of said call;
third means for time stamping said packets according to the time when said packets appear on data links, said packets being stored in chronological order responsive to said time stamp; and
fourth means responsive to a preselected one of a group consisting of a triggering event, a completion of a call, and filtered data which occurs during a call in progress for producing an immediate read out of said chronologically accumulated call data in a data block located at a single location, where the call may be in pro progress.

6. A service observing system for use in an SS#7 network of high speed data links for transmitting data packets guided by an address included in each of said packets, said network including a plurality of signal transfer points, said observation system comprising:
a pyramid structure means comprising data processing means having said data links coupled to individually associated inputs at a base of said pyramidal structure;
call-completion analysis meads for funneling said data derived from packets appearing on SS#7 network signaling of high speed data links, said call-completion analysis means delivering said funneled data to an apex of said pyramidal structure;
said pyramidal structure means including means for processing said data from said packets appearing on said high speed data links at said inputs at said base to said call-completion analysis means apex, said structure concentrating said data delivered to said apex to become only tat amount of data which is usable information; and
means associated with said call-completion analysis means for immediately transmitting call, information from data stored chronologically in a data block at a single location over a wide area network to other computers, where the call may be in progress.

7. The service observing system of one of the claims 1–6, wherein said data packets are formed in individual protocol types, further comprising;
counting means for counting a data content of said data packets by said protocol types; and
means responsive to a count by said counting means for compiling information in order to generate synchronization and link occupancy graphs, and alarms, plus average and peak occupancy statistics; and
means for transmitting in real-time said graphs and other statistical reports over at least a wide area network to a plurality of computers.

8. The service observing system of one of claims 1–6 and means whereby said system has a capacity for simultaneously processing 100% of said data packets as they appear.

9. The service observation system of one of claims 1–6 and software means-distributed throughout said service observing system for real time processing, correlating, and reformatting message signal units contained in said data into detail custom call and transaction records while said call is in progress.

10. The service observing system of one of claims 1–6 wherein said data packet is an initial address message and is stored at a data block location identified by data from said initial address message, and means for storing all fixture and related data packets with the same address data at the same location immediately, said stored data being chronological in the same data block form.

11. The service observing system of one of the claims 1–6 further comprising a plurality of cluster controller means, means for filtering data relating to specific calls, said filtering being carried out on a basis selected by a user of said service observing system, and means for forwarding said filtered data to at least preselected ones of a plurality of computers.

12. The system of claim 11 comprising a communication controller means for transmitting at least some call information to at least one of a plurality of service observing systems, other than the service observing system which originally processed said call information.

13. A service observing system for a network of high speed data links for transmitting message signal units, said network having switching points and signal transfer points, said system comprising:
a pyramidal structure of data processor means having said data links coupled to a base of said pyramidal structure, and a first communication controller means coupled to an apex of said pyramidal structure;
a second communication controller means;
message signal data units appearing on said data links being transmitted through said pyramidal structure to said first or second communication controller means;
said second communicating controller means providing a protocol for real time transmission of call data over a wide area network to other communications controller means located at separate signal transfer points, and
means in a mated service observing system accessible via said wide area network for correlation and accumulation of the data in said message signal units chronologically at a single location in real-time in order to provide immediately available call records in response to a demand therefor, where the call may be in progress.

14. The service observing system of claim 13 and means responsive to said message signal units for forming information in said message signal units into data blocks, and said data blocks having a standard format with human language labels, means for differentiating between completed and incomplete calls, and means for giving immediate service responsive to detection of equipment blockage and failures on said high speed network.

15. The service observing system of claim 14 wherein said standard format includes data blocks having at least some data selected from a group consisting of date, time, calling number, called number, charged number, originating and destination point codes, circuit identification code, duration of calls, disposition for billing validation, quality of service, traffic, fraud detection, maintenance, criminal transactions, and reports.

16. The service observing system of claim 15 and means for filtering information in said data blocks to be used to concentrate said data, and means responsive to said information in at least some of said data blocks for generating and distributing statistical reports.

17. A service observing system for monitoring events on an SS#7 network in real time as said events first occur, said system comprising:

an SS#7 switching network containing data links, data appearing on said links in packet forms;

a first wide area network, comprising a plurality of service observing equipments in different locations and connected to monitor the data links, said equipments in at least some of said different locations being connected in a mated configuration;

a second wide area network for interconnecting said mated equipments with centralized computers for coordinating said service observing equipment, and each of said computers processing data relating to individual calls; and means at a single service observing location for chronologically storing data for producing an in-progress call record regardless of where said monitoring equipment may be located, where the call may be in progress.

18. The service observing system of claim 17 wherein said SS#7 and first and second wide area networks are included in a single combined network.

19. The service observing system of claim 17 wherein said SS#7 and first and second wide area networks include at least two separate networks.

20. The system of claim 17 and means responsive to data information for locally correlating and storing at least some data identified as being locally correlatable and storable, and means also responsive to data information for immediately transmitting at least some data identified as not being in a locally correlatable and storable form to correlation means in a mated service observing system.

* * * * *